(12) United States Patent
Yamanaka et al.

(10) Patent No.: US 7,784,575 B2
(45) Date of Patent: Aug. 31, 2010

(54) HYBRID VEHICLE DRIVE CONTROL SYSTEM

(75) Inventors: Tsuyoshi Yamanaka, Yamato (JP); Kazuyuki Kouno, Hiratsuka (JP); Munetoshi Ueno, Atsugi (JP); Tadashi Okuda, Hadano (JP); Shinichiro Joe, Yokohama (JP); Taiichi Onoyama, Yokohama (JP); Terumasa Hidaka, Atsugi (JP); Haruhisa Tsuchikawa, Isehara (JP); Ken Ito, Machida (JP); Kazutaka Adachi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 760 days.

(21) Appl. No.: 11/593,008

(22) Filed: Nov. 6, 2006

(65) Prior Publication Data
    US 2007/0102207 A1    May 10, 2007

(30) Foreign Application Priority Data
    Nov. 7, 2005    (JP)    ............... 2005-322406

(51) Int. Cl.
    *B60W 10/02*    (2006.01)
(52) U.S. Cl. ................... 180/65.275; 180/65.285; 180/65.265
(58) Field of Classification Search ............ 180/65.265, 180/65.275, 65.285; 477/6, 181; 701/22, 701/67, 68; 903/912, 914, 946
    See application file for complete search history.

(56) References Cited

U.S. PATENT DOCUMENTS

| | | | | |
|---|---|---|---|---|
| 4,724,939 A | * | 2/1988 | Lockhart et al. ............. | 192/3.3 |
| 4,957,194 A | * | 9/1990 | Sawa et al. ................... | 477/169 |
| 5,558,173 A | * | 9/1996 | Sherman ..................... | 180/53.8 |
| 5,558,175 A | * | 9/1996 | Sherman ..................... | 180/65.25 |
| 5,626,536 A | * | 5/1997 | Kono et al. .................. | 477/181 |
| 5,951,614 A | * | 9/1999 | Tabata et al. .................. | 701/54 |
| 5,991,680 A | * | 11/1999 | Kono et al. ..................... | 701/67 |
| 6,019,698 A | * | 2/2000 | Lawrie et al. ................... | 477/5 |

(Continued)

FOREIGN PATENT DOCUMENTS

DE    102 60 435 A1    7/2004

(Continued)

OTHER PUBLICATIONS

The extended European Search Report of corresponding European Application No. 06255699.8-2421, dated Mar. 26, 2010.

*Primary Examiner*—Lesley Morris
*Assistant Examiner*—Vaughn T Coolman
(74) *Attorney, Agent, or Firm*—Global IP Counselors, LLP

(57) ABSTRACT

A hybrid vehicle drive control system is configured to perform engine startup when switching from an electric drive mode to a hybrid drive mode, without creating a sense of output torque loss. In particular, a controller selectively controls a first clutch disposed between the engine and the motor/generator and a second clutch disposed between the motor/generator and a drive wheel to switch between an electric drive mode in which the first clutch is released and the second clutch is engaged, and a hybrid drive mode in which both the first and second clutches are engaged. The controller sets the second torque transfer capacity to a value that is more than zero and less than the target motor/generator torque of the motor/generator when switching from the electric drive mode to the hybrid drive mode and when starting the engine.

21 Claims, 16 Drawing Sheets

U.S. PATENT DOCUMENTS

| | | | | |
|---|---|---|---|---|
| 6,166,499 | A * | 12/2000 | Kanamori et al. | 318/139 |
| 6,176,807 | B1 * | 1/2001 | Oba et al. | 477/5 |
| 6,244,368 | B1 * | 6/2001 | Ando et al. | 180/65.25 |
| 6,342,027 | B1 * | 1/2002 | Suzuki | 477/5 |
| 6,364,807 | B1 * | 4/2002 | Koneda et al. | 477/5 |
| 6,409,623 | B1 * | 6/2002 | Hoshiya et al. | 475/5 |
| 6,524,219 | B2 * | 2/2003 | Mesiti et al. | 477/5 |
| 6,655,485 | B1 * | 12/2003 | Ito et al. | 180/65.6 |
| 6,709,364 | B2 * | 3/2004 | Eguchi et al. | 477/174 |
| 7,160,225 | B2 * | 1/2007 | Berger et al. | 477/5 |
| 7,165,638 | B2 * | 1/2007 | Ito et al. | 180/65.23 |
| 7,207,404 | B2 * | 4/2007 | Ito et al. | 180/65.28 |
| 7,351,182 | B2 * | 4/2008 | Kobayashi | 477/5 |
| 7,370,715 | B2 * | 5/2008 | Colvin et al. | 180/65.28 |
| 7,377,344 | B2 * | 5/2008 | Barske | 180/65.28 |
| 7,496,435 | B2 * | 2/2009 | Iwatsuki et al. | 701/22 |
| 2003/0173125 | A1 * | 9/2003 | Ishikawa | 180/65.2 |
| 2004/0045750 | A1 * | 3/2004 | Baraszu et al. | 180/65.2 |
| 2004/0060753 | A1 * | 4/2004 | Ito et al. | 180/65.2 |
| 2004/0152558 | A1 * | 8/2004 | Takami et al. | 477/3 |
| 2005/0090370 | A1 * | 4/2005 | Berger et al. | 477/167 |
| 2005/0155803 | A1 | 7/2005 | Schiele | |

FOREIGN PATENT DOCUMENTS

| | | |
|---|---|---|
| DE | 103 53 256 B3 | 3/2005 |
| EP | 1 762 452 A2 | 3/2007 |
| JP | 11-082260 | 3/1999 |
| JP | 2000-224714 A | 8/2000 |
| JP | 2000-225860 A | 8/2000 |
| JP | 2000-255285 A | 9/2000 |
| JP | 2001-010360 A | 1/2001 |
| JP | 2003-212003 A | 7/2003 |
| JP | 2005-522619 A | 10/2003 |
| JP | 2006-188223 A | 7/2006 |

* cited by examiner

HYBRID VEHICLE DRIVE CONTROL SYSTEM

CROSS-REFERENCE TO RELATED APPLICATIONS

This application claims priority to Japanese Patent Application No. 2005-322406, filed on Nov. 7, 2005. The entire disclosure of Japanese Patent Application No. 2005-322406 is hereby incorporated herein by reference.

BACKGROUND OF THE INVENTION

1. Field of the Invention

The present invention generally relates to a hybrid vehicle drive control system for a hybrid vehicle having an electric drive (EV) mode in which a drive wheel is solely driven by a motor/generator and a hybrid drive (HEV) mode in which the drive wheel is driven by an engine and the motor/generator, or the engine only. More particularly, the present invention relates to a hybrid vehicle drive control system that is configured to control a torque transfer capacity of a clutch to start the engine from the torque of the when motor/generator switching to the latter the hybrid drive (HEV) mode from the electric drive (EV) mode.

2. Background Information

Various configurations have been proposed for hybrid vehicle drive control systems to be used in hybrid vehicles. One such hybrid drive system is presented in Japanese Laid-Open Patent Publication No. 11-082260. The hybrid vehicle drive control system presented in Japanese Laid-Open Patent Publication No. 11-082260 has a motor/generator arranged between an engine and a transmission so as to be coupled to a shaft that directs the rotation of the engine to the transmission. A first clutch is arranged for operatively connecting and disconnecting the engine to and from the motor/generator, while a second clutch is arranged for operatively connecting and disconnecting the motor/generator to and from the output shaft of the transmission. The second clutch is provided to replace a conventional torque converter that is used in a conventional automatic transmission.

A hybrid vehicle equipped with a hybrid vehicle drive system like that just described can be put into an electric drive (EV) mode in which the vehicle travels solely by means of power from the motor/generator by disconnecting the first clutch and connecting the second clutch. Such a hybrid vehicle can also be put into a hybrid drive (HEV) mode in which the vehicle travels using power from both the engine and the motor/generator by connecting both the first clutch and the second clutch. Accordingly, the second clutch is a clutch that directs the drive power from both the engine and the motor/generator to the drive wheel. In the electric drive (EV) mode, the motive power of the engine is of course not needed, and therefore the engine is stopped.

However, in such a hybrid vehicle, the output of the engine during travel in the HEV mode is needed. Also when switching from the electric drive (EV) mode to the hybrid drive (HEV) mode, it is necessary to perform the drive mode switching while starting up the engine. When switching drive modes and simultaneously starting up the engine, the switching of the drive mode from the electric drive (EV) mode to the hybrid drive (HEV) mode is conventionally performed by engaging the first clutch, which is disposed between the engine and the motor/generator, and then starting the engine by cranking the engine from a stopped state via the drag torque of the first clutch, as disclosed in Japanese Laid-Open Patent Publication No. 11-082260.

Furthermore, it also proposed in this conventional technology to temporarily disengage the second clutch, which is disposed between the motor/generator and the transmission, when starting the engine, and then engaging of the first clutch so as to prevent shocks caused by the transmission to the drive wheels due to, for example, torque fluctuations that arise when engaging the first clutch, as well as torque fluctuations that include engine torque overshoot and polarity inversion at engine startup.

In view of the above, it will be apparent to those skilled in the art from this disclosure that there exists a need for an improved hybrid vehicle drive control system. This invention addresses this need in the art as well as other needs, which will become apparent to those skilled in the art from this disclosure.

SUMMARY OF THE INVENTION

However, in such conventional technology, while cranking the engine by engaging the first clutch that is between the engine and the motor/generator, the second clutch that is between the motor/generator and the transmission is disengaged such that the motive power source to the drive wheels is also disengaged during this cranking of the engine. Therefore, the torque is no longer transmitted to the drive wheels. Consequently, there is a risk that the output torque to the drive wheels will fall to 0 and the absence of the output torque during cranking of the engine will be felt, and cause discomfort for the operator, particularly during vehicle acceleration.

While disengaging the second clutch that is between the motor/generator and the transmission prevents the transmission of fluctuations to the drive wheels at engine startup caused by engagement of the first clutch, unfortunately, the output torque to the drive wheels during engine cranking will fall to 0 and create a sense of loss of output torque. The present invention is based on recognition of the fact that it is possible to solve the abovementioned problems by slip engaging the second clutch instead of fully engaging as in the conventional case. Accordingly, one object of the present invention is to provide a hybrid vehicle drive control system that embodies this concept and solves the abovementioned problems.

In order to achieve the above mentioned object, a hybrid vehicle drive control system in accordance with a first aspect of the present invention is basically provided with an engine, a motor/generator, a first clutch, a second clutch and a controller. The first clutch is configured and arranged to change a first torque transfer capacity between the engine and the motor/generator. The second clutch is configured and arranged to change a second torque transfer capacity between the motor/generator and at least one drive wheel. The controller is configured to selectively control the first and second clutches to switch between an electric drive mode in which the first clutch is released and the second clutch is engaged, and a hybrid drive mode in which both the first and second clutches are engaged. The controller is further configured to set the second torque transfer capacity to a value that is more than zero and less than a motor/generator torque of the motor/generator when switching from the electric drive mode to the hybrid drive mode and when starting the engine.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

Figure 1:
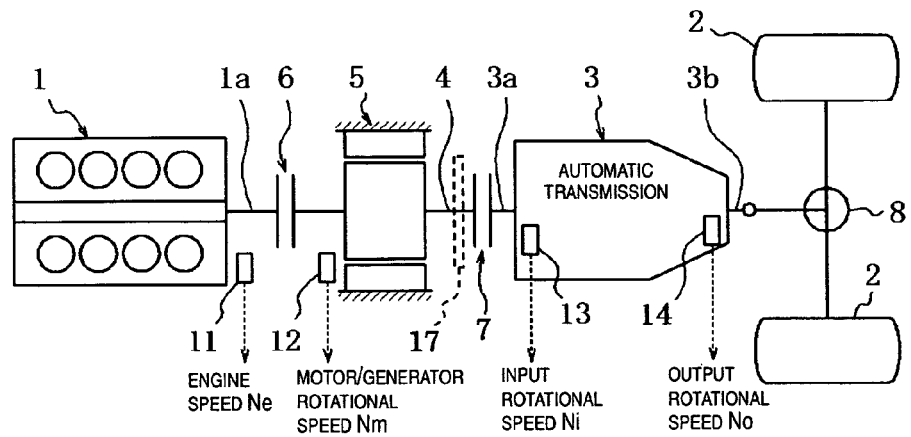
FIG. 1 is a schematic plan view showing a power train of a hybrid vehicle in which a hybrid vehicle drive control system in accordance with one embodiment of the present invention can be applied.
Figure 2:
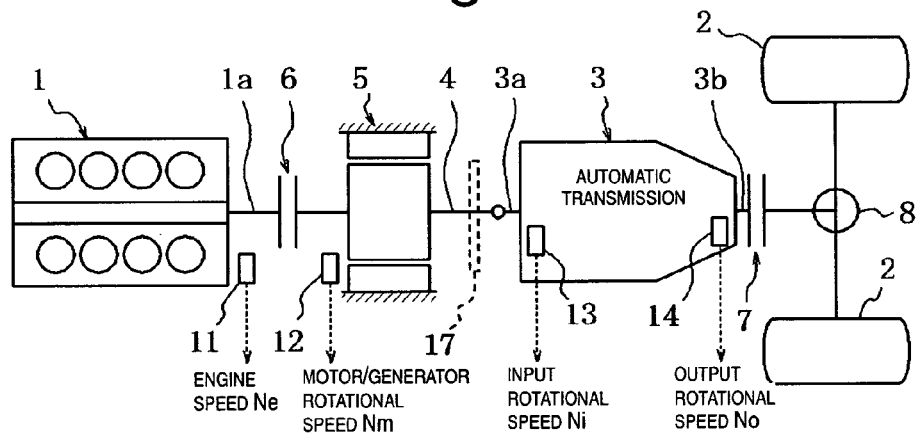
FIG. 2 is a schematic plan view showing a power train of another hybrid vehicle in which the hybrid vehicle drive control system in accordance with the present invention can be applied.
Figure 3:
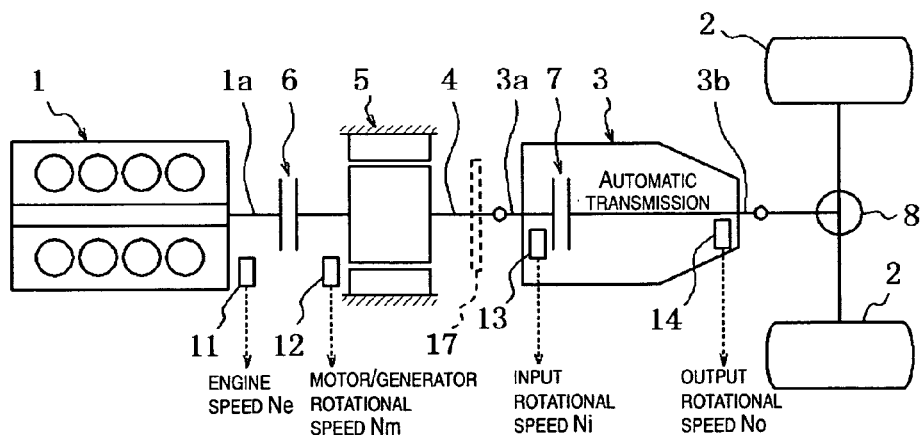
FIG. 3 is a schematic plan view showing a power train of another hybrid vehicle in which the hybrid vehicle drive control system in accordance with the present invention can be applied.

Referring initially to FIGS. 1 to 3, a front engine/rear wheel drive vehicle (rear wheel drive hybrid vehicle) is illustrated in each of the Figures in which each of the hybrid vehicles is equipped with a hybrid vehicle drive control system in accordance with one preferred embodiment of the present invention. Basically, the hybrid vehicles of FIGS. 1 to 3 illustrate three examples of alternate power trains of hybrid vehicles in which the hybrid vehicle drive control system in accordance with the present invention can be applied. In these examples, each hybrid vehicle includes, among other things, an internal combustion engine 1 with a crankshaft 1a, a pair of rear drive wheels 2, an automatic transmission 3 with an input shaft 3a, a power transfer shaft 4, a motor/generator 5, a first clutch 6 and a second clutch 7. In the power train of the hybrid vehicle shown in FIG. 1, the automatic transmission 3 is arranged rearward of and in direct alignment (in tandem) with the engine 1 in the same manner as in a regular rear wheel drive automobile. The motor/generator 5 is operatively arranged on the shaft 4 that serves to transfer the rotation of the crankshaft 1a of the engine 1 to the input shaft 3a of the automatic transmission 3. Also, as explained below, an auxiliary device 17 can be installed in the power train of each of the hybrid vehicles of FIGS. 1 to 3 between the motor/generator 5 and the rear drive wheels 2.

The motor/generator 5 is configured and arranged such that it can be used as a motor or an electric generator. The motor/generator 5 is operatively arranged between the engine 1 and the automatic transmission 3. The first clutch 6 is operatively arranged between the motor/generator 5 and the engine 1, i.e., more specifically, between the shaft 4 and the engine crankshaft 1a. The first clutch 6 is configured and arranged to selectively engage or disengage the connection between the engine 1 and the motor/generator 5. The first clutch 6 is configured and arranged such that the torque transfer capacity thereof can be changed either continuously or in a stepwise manner. For example, the first clutch 6 can be a multi-plate wet clutch configured and arranged such that its torque transfer capacity can be changed by controlling the flow rate of a hydraulic clutch fluid (hydraulic oil) and the pressure of the hydraulic clutch fluid (clutch connection hydraulic pressure) either continuously or in a stepwise fashion by a proportional solenoid.

The second clutch 7 is provided between the motor/generator 5 and the automatic transmission 3, i.e., more specifically, between the shaft 4 and the transmission input shaft 3a. The second clutch 7 is configured and arranged to selectively engage or disengage the connection between the motor/generator 5 and the automatic transmission 3. Similarly to the first clutch 6, the second clutch 7 is configured and arranged such that the torque transfer capacity thereof can be changed either continuously or in a stepwise manner. For example, the second clutch 7 can be a multi-plate wet clutch configured such that its torque transfer capacity can be changed by controlling the flow rate of a hydraulic clutch fluid (hydraulic oil) and the pressure of the hydraulic clutch fluid (clutch connection hydraulic pressure) continuously or in a stepwise fashion by a proportional solenoid.

In this embodiment of the present invention, the automatic transmission 3 is preferably a conventional automatic transmission such as one presented in pages C-9 to C-22 of the "Nissan Skyline New Model (CV35) Handbook" published by Nissan Motor Company, Ltd. More specifically, the automatic transmission 3 is configured and arranged such that a plurality of friction elements (clutches and brakes) can be selectively engaged and disengaged and the power transmission path (e.g., first gear, second gear, etc.) is determined based on the combination of the engaged and disengaged friction elements. The automatic transmission 3 is configured and arranged to transfer the rotation of the input shaft 3a to an output shaft 3b after converting the rotation at a gear ratio corresponding to the selected gear. The rotation of the output shaft 3b is distributed to the left and right rear wheels 2 by a differential gear unit 8 and thereby contributes to moving the vehicle. Of course, it will be apparent to those skilled in the art from this disclosure that the automatic transmission 3 is not limited to a step-type automatic transmission like that just described, and it is also acceptable to use a continuously variable transmission (CTV).

When the vehicle is traveling under low load/low speed conditions or when the vehicle is starting to move from a stopped state, the vehicle requests an electric drive (EV) mode and the engine 1 is stopped. Under the EV mode, the power train shown in FIG. 1 is controlled such that the first clutch 6 is released, the second clutch 7 is engaged, and the automatic transmission 3 is in a power transmitting state. When the motor/generator 5 is driven under these conditions, the output rotation of the motor/generator 5 alone is transferred to the transmission input shaft 3a and the transmission 3 transfers the rotation of the input shaft 3a to the transmission output shaft 3b at a gear ratio corresponding to the selected gear. The rotation of the transmission output shaft 3b is then transmitted to the rear wheels 2 through the differential gear unit 8 and the vehicle moves in the EV mode using output from only the motor/generator 5.

When the vehicle is traveling at a high speed, under a large load, or under conditions in which the amount of electric power that can be extracted from the battery is small, the vehicle requests a hybrid drive (HEV) mode. Under the HEV mode, the power train is controlled such that the first clutch 6 and the second clutch 7 are both engaged and the automatic transmission 3 is in a power transmitting state. In this state, the output rotation from the engine 1 or the output rotations from both the engine 1 and the motor/generator 5 are transferred to the transmission input shaft 3a and the transmission 3 transfers the rotation of the input shaft 3a to the transmission output shaft 3b at a gear ratio corresponding to the selected gear. The rotation of the transmission output shaft 3b is then transmitted to the rear wheels 2 through the differential gear unit 8 and the vehicle moves in the HEV mode using output from both the engine 1 and the motor/generator 5 or only the engine 1.

When the vehicle is traveling in the HEV mode and the engine 1 is running at optimum fuel efficiency such that a surplus of energy is produced, the surplus energy is used to operate the motor/generator 5 as an electric generator and, thereby, convert the surplus energy into electric energy. The generated electric energy then can be stored and used to drive the motor/generator 5 as a motor, thereby improving the fuel efficiency of the engine 1.

Although, in FIG. 1, the second clutch 7 (which is configured and arranged to connect and disconnect the motor/generator 5 to and from the drive wheels 2) is disposed between the motor/generator 5 and the automatic transmission 3, the same function can be achieved by disposing the second clutch 7 between the automatic transmission 3 and the differential gear unit 8 as shown in FIG. 2.

Also, instead of providing a dedicated second clutch 7 in front of the automatic transmission 3 as in FIG. 1 or in back of the automatic transmission 3 as in FIG. 2, it is also acceptable to use an existing friction element that is provided inside the automatic transmission 3 for selecting a forward gear or a reverse gear as the second clutch 7, as shown in FIG. 3. In the structure shown in FIG. 3, when the friction element that constitutes the second clutch 7 is engaged so as to execute the mode selection function (i.e., switching between the EV mode and the HEV mode), the same friction element also functions to put the automatic transmission into a power transmitting state. Since a dedicated second clutch is not required in such structure shown in FIG. 3, this arrangement is highly advantageous from the standpoint of cost.

Figure 4:
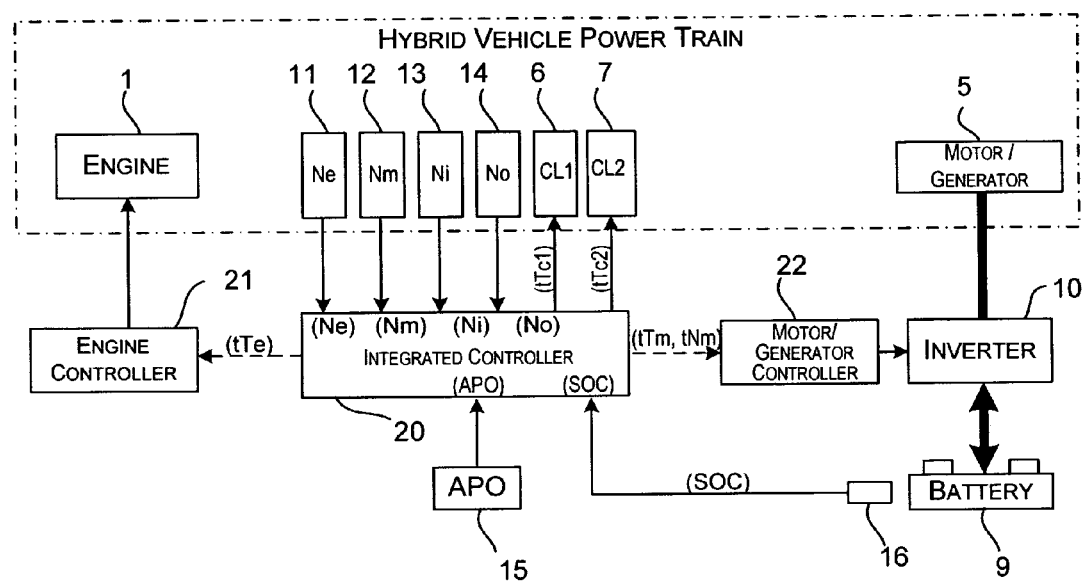
FIG. 4 is a block diagram of the hybrid vehicle drive control system for the power trains shown in FIGS. 1 to 3.

FIG. 4 is a block diagram illustrating the hybrid vehicle drive control system for controlling the hybrid vehicle power train comprising the engine 1, the motor/generator 5, the first clutch 6, and the second clutch 7 as shown in FIGS. 1 to 3. In the explanations of the hybrid vehicle drive control system of the present invention below, the power train shown in FIG. 1 is used as the power train of the hybrid vehicle in which the hybrid vehicle drive control system is applied. However, it will be apparent to those skilled in the art of this disclosure that this control can be easily adapted to the other power trains shown in FIGS. 2 and 3.

The control system shown in FIG. 4 has an integrated controller 20 that is configured to execute integrated control of the operating point of the power train. The integrated controller 20 is configured to specify the operating point of the power train in this example in terms of a target engine torque tTe, a target motor/generator torque tTm (a target motor/generator rotational speed tNm is also acceptable), a target torque transfer capacity tTc1 of the first clutch 6, and a target torque transfer capacity tTc2 of the second clutch 7.

Generally speaking, the integrated controller 20 is configured to determine the target torque transfer capacity tTc2 of the second clutch 7, which includes a motor/generator torque component or portion and an engine torque component or portion. More specifically, the integrated controller 20 is configured to calculate the motor/generator torque component of the target torque transfer capacity tTc2 based on a motor/generator torque tTm and a torque transfer capacity margin allowance (e.g., safety factor) that is set for the motor/generator torque, and to calculate the engine torque component of the target torque transfer capacity tTc2 based on the target engine torque tTe and a torque transfer capacity margin allowance (e.g., safety factor) that is set for the engine torque when the drive wheels 2 are driven at least by the motor/generator 5. As used herein, the "safety factor" means a margin allowance of a torque transfer capacity of a clutch, which is required to reliably place the clutch in a non-slipping state.

With the abovementioned hybrid vehicle drive control system according to the present invention, at engine startup when switching to the hybrid drive mode during travel in the electric drive mode, the second clutch torque transfer capacity is set to a value that is more than zero and less than the target motor/generator torque tTm at engine startup. Consequently, even if torque fluctuations, including those caused by polarity inversion and engine torque overshoot at engine startup during the abovementioned mode switching, or torque fluctuations when engaging the first clutch are directed toward the drive wheels 2 via the second clutch 7, these torque fluctuations are absorbed by the slipping of the second clutch 7, and thereby do not transmit to the drive wheels 2, which prevents the shock attendant with these torque fluctuations. On the other hand, because the second clutch 7 maintains a torque transfer capacity that is more than zero and less than the target motor/generator torque tTm at engine startup, the corresponding torque can be continuously directed to the drive wheels 2. Thus, it is possible to avoid the problem caused by the conventional measure, wherein the second clutch 7 is left in the disengaged state during engine startup, i.e., the problem that creates a sense of loss of drive force, and to thereby eliminate the attendant discomfort.

According to the present invention, while traveling by using the drive power from the motor/generator 5 as at least part of the vehicle drive force, the motor/generator torque component of the target second clutch torque transfer capacity tTc2 is derived separately from the engine torque component of the target second clutch torque transfer capacity tTc2 based on the target motor/generator torque tTm and the motor/generator safety factor. Consequently, the safety factor is appropriate for the motor/generator torque share of the drive force, and thus, the torque transfer capacity of the second clutch 7 can be prevented from becoming excessively large. Therefore, the problems related to degradation in fuel economy and a reduction of drive power performance can be avoided.

The integrated controller 20 preferably includes a microcomputer with a hybrid power transmitting control program that controls the operations of the engine 1, the motor/generator 5, and the first and second clutches 6 and 7. In other words, the microcomputer of the integrated controller 20 is programmed to control the operations of the engine 1, the motor/generator 5, and the first and second clutches 6 and 7 as discussed below. The integrated controller 20 also include other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the integrated controller 20 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The integrated controller 20 is operatively connected to the following sensors: an engine speed sensor 11, a motor/generator speed sensor 12, a transmission input rotational speed sensor 13, a transmission output rotational speed sensor 14, an accelerator pedal position sensor 15 and a state of charge sensor 16. The engine speed sensor 11, the motor/generator speed sensor 12, the input rotational speed sensor 13, and the output rotational speed sensor 14 are arranged as shown in FIGS. 1 to 3. The engine speed sensor 11 is configured and arranged to detect an engine speed Ne of the engine 1 and produce a signal indicative of the detected engine speed Ne that is inputted to the integrated controller 20. The motor/generator speed sensor 12 is configured and arranged to detect a rotational speed Nm of the motor/generator 5 and produce a signal indicative of the detected rotational speed Nm that is inputted to the integrated controller 20. The transmission input rotational speed sensor 13 is configured and arranged to detect a rotational speed Ni of the input shaft 3a of the automatic transmission 3 and produce a signal indicative of the detected rotational speed Ni that is inputted to the integrated controller 20. The transmission output rotational speed sensor 14 is configured and arranged to detect a rotational speed No of the output shaft 3b of the automatic transmission 3 and produce a signal indicative of the detected rotational speed No that is inputted to the integrated controller 20. The accelerator pedal position sensor 15 is configured and arranged to detect an accelerator pedal depression amount (accelerator position APO) and produce a signal indicative of the detected accelerator pedal depression amount (accelerator position APO) that is inputted to the integrated controller 20. The state of charge sensor 16 is configured and arranged to detect a state of charge SOC (usable electric power) of a battery 9 in which electric power for the motor/generator 5 is stored and produce a signal indicative of the detected state of charge SOC of the battery 9 that is inputted to the integrated controller 20. Thus, the integrated controller 20 receives these input signals for determining the operating point of the power train.

The integrated controller 20 is configured to select a drive (operating or traveling) mode (EV mode or HEV mode) that is capable of delivering the drive force desired by the driver based on the accelerator position APO, the state of charge SOC of the battery 9, and the transmission output rotational speed No (vehicle speed VSP) and computes the target engine torque tTe, the target motor/generator torque tTm (target motor/generator rotational speed tNm also acceptable), the target first clutch torque transfer capacity tTc1, and the target second clutch torque transfer capacity tTc2. The target engine torque tTe is fed to an engine controller 21 and the target motor/generator torque tTm (or the target motor/generator rotational speed tNm) is fed to a motor/generator controller 22.

The engine controller 21 is configured to control the engine 1 such that the engine torque Te becomes equal to the target engine torque tTe, and the motor/generator controller 22 is configured to control the motor/generator 5 through the battery 9 and an inverter 10 such that the torque Tm (or the rotational speed Nm) of the motor/generator 5 becomes equal to the target motor/generator torque tTm (or the target motor/generator rotational speed tNm).

The integrated controller 20 is configured to supply a solenoid current corresponding to the target first clutch torque transfer capacity tTc1 to a connection control solenoid (not shown) of the first clutch 6 and a solenoid current corresponding to the target second clutch torque transfer capacity tTc2 to a connection control solenoid (not shown) of the second clutch 7. In this way, the connection force (holding force) of the first clutch 6 is controlled such that the torque transfer capacity Tc1 of the first clutch 6 becomes equal to the target torque transfer capacity tTc1 and the connection force of the second clutch 7 is controlled such that the torque transfer capacity Tc2 of the second clutch 7 becomes equal to the target torque transfer capacity tTc2.

Figure 5:
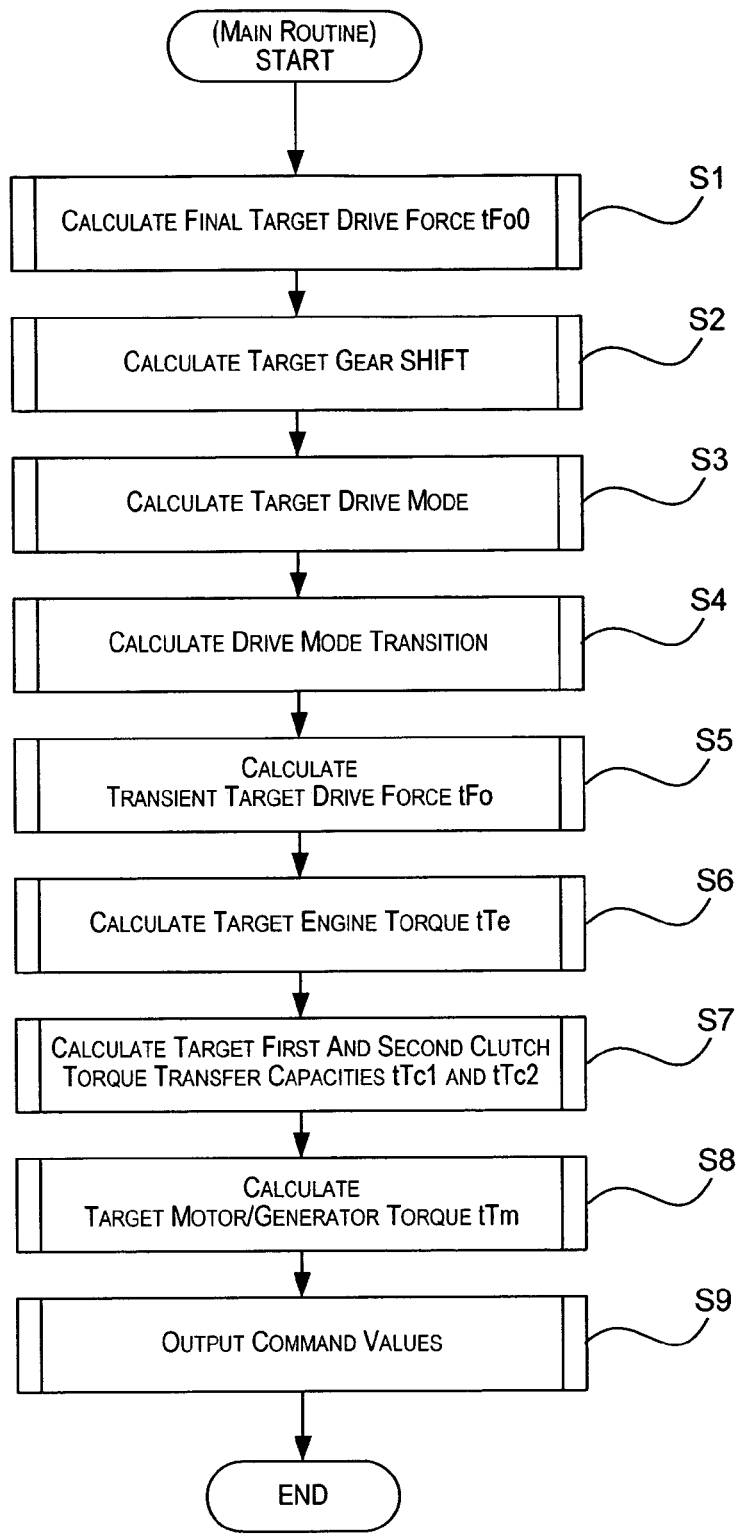
FIG. 5 is a flowchart showing a main routine of a drive force control program executed by an integrated controller of the hybrid vehicle drive control system in accordance with the illustrated embodiment of the present invention.

FIG. 5 is a flowchart showing a main routine of a control processing executed by the integrated controller 20 for selecting the traveling or drive mode (EV mode or HEV mode) and computing the target engine torque tTe, the target motor/generator torque tTm (or the target motor/generator rotational speed tNm), the target first clutch torque transfer capacity tTc1, and the target second clutch torque transfer capacity tTc2.

First, in step S1, the integrated controller 20 is configured to calculate a final target drive force tFo0 in a steady condition based on the acceleration position opening APO and the vehicle speed VSP using a predetermined final target drive force map.

Next, in step S2, the integrated controller 20 is configured to determine a target gear SHIFT from the acceleration position opening APO and the vehicle speed VSP based on a predetermined gear shift map. In step S2, the integrated controller 20 is configured to issue a command to a gear shift control unit (not shown) of the automatic transmission 3 to shift the automatic transmission 3 to the target gear SHIFT.

In step S3, the integrated controller 20 is configured to use a predetermined target drive mode (EV mode, HEV mode) region map to determine the target drive mode based on the acceleration position opening APO and the vehicle speed VSP.

The target drive mode region map is generally arranged such that the HEV mode is assigned as the target drive mode during high load (large acceleration position opening) and high speed travel, and the EV mode is assigned during low load and low speed travel.

Next, in step S4, the integrated controller 20 is configured to calculate the drive mode transition as follows by comparing the current drive mode and the target drive mode. If the current drive mode and the target drive mode match, then the integrated controller 20 is configured to issue a command to maintain the current drive mode, i.e., the EV mode or the HEV mode. If the current drive mode is the EV mode and the target drive mode is the HEV mode, then the integrated controller 20 is configured to issue a command to switch the mode from the EV mode to the HEV mode. If the current drive mode is the HEV mode and the target drive mode is the EV mode, then the integrated controller 20 is configured to issue a command to switch the mode from the HEV mode to the EV mode. Furthermore, outputting these commands in step S9 either maintains or switches the mode in accordance with those commands.

In step S5, the integrated controller 20 is configured to calculate, based on the current drive force, the moment-by-moment transient target drive force tFo needed to transition to the final target drive force tFo0 (derived in step S1) with a predetermined response characteristic. This calculation can be performed by, for example, passing the final target drive force tFo0 signal through a low pass filter that has a predetermined time constant, and then setting the transient target drive force tFo to the output obtained thereby.

In step S6, the integrated controller 20 is configured to calculate the target engine torque tTe as follows. If the current drive mode is the HEV mode, then a target input torque tTi of the automatic transmission 3 is calculated that will be required in order to attain the transient target drive force tFo using the following equation (1):

$$tTi = tFo \times Rt/if/iG \qquad (1)$$

In this equation, the term Rt is the tire effective radius of the drive wheels 2, the term if is the final gear ratio, and the term iG is the gear ratio of the automatic transmission 3, which is determined by the currently selected gear.

Subsequently, the target engine torque tTe is calculated by the equation (2) below, based on the target input torque tTi, the input rotational speed Ni of the automatic transmission 3, the engine rotational speed Ne, and a target charging and discharging electric power tP that corresponds to the state of charge SOC (dischargeable electric power) of the battery 9.

$$tTe = (tTi \times Ni - tP)/Ne \qquad (2)$$

Furthermore, if the current drive mode is the EV mode, then engine torque is not needed, and the target engine torque tTe is therefore set to 0.

In step S9, the integrated controller 20 is configured to issue a command to the engine controller 21 (FIG. 4), which performs control so that the engine 1 attains the target engine torque tTe determined as described above.

In step S7, the integrated controller 20 is configured to calculate the target torque transfer capacities tTc1 and tTc2 of the first clutch 6 and the second clutch 7, respectively, by executing the subroutines shown in the flowcharts of FIG. 6 through FIG. 13 as described below.

Figure 6:
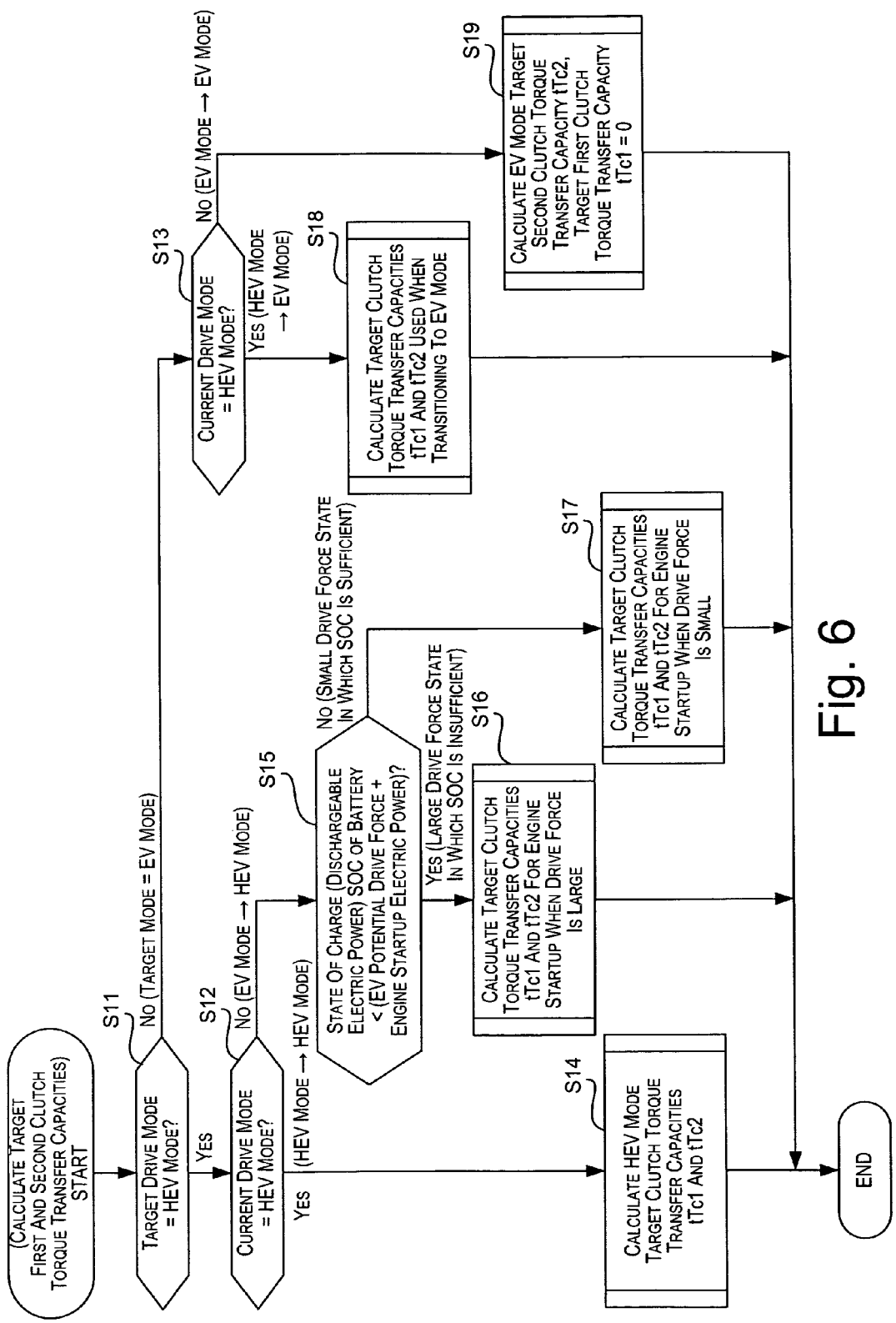
FIG. 6 is a flowchart showing a subroutine of the drive force control program for calculating target first and second clutch torque transfer capacities in accordance with the illustrated embodiment of the present invention.

First, in step S11 in FIG. 6, the integrated controller 20 is configured to determine whether the target drive mode, which was determined in step S3 in FIG. 5, is the HEV mode or not (EV mode). Subsequently, with either result in step S11, the integrated controller 20 is configured to determine whether the current drive mode is the HEV mode or not (EV mode) in step S12 and step S13.

If the integrated controller 20 is configured to determine in step S11 that the target drive mode is the HEV mode, and in step S12 that the current drive mode is also the HEV mode, i.e., if the HEV mode is to be maintained, then, in step S14, the integrated controller 20 is configured to set the target torque transfer capacities tTc1 and tTc2 of the first clutch 6 and the second clutch 7 to target values for the HEV mode, and to control the engagement of the first and second clutches 6 and 7 by issuing commands in step S9 of FIG. 5 to the first clutch 6 and the second clutch 7, as shown in FIG. 4, so that the first and second clutches 6 and 7 attain the target first clutch torque transfer capacity tTc1 and the target second clutch torque transfer capacity tTc2, respectively.

Figure 7:
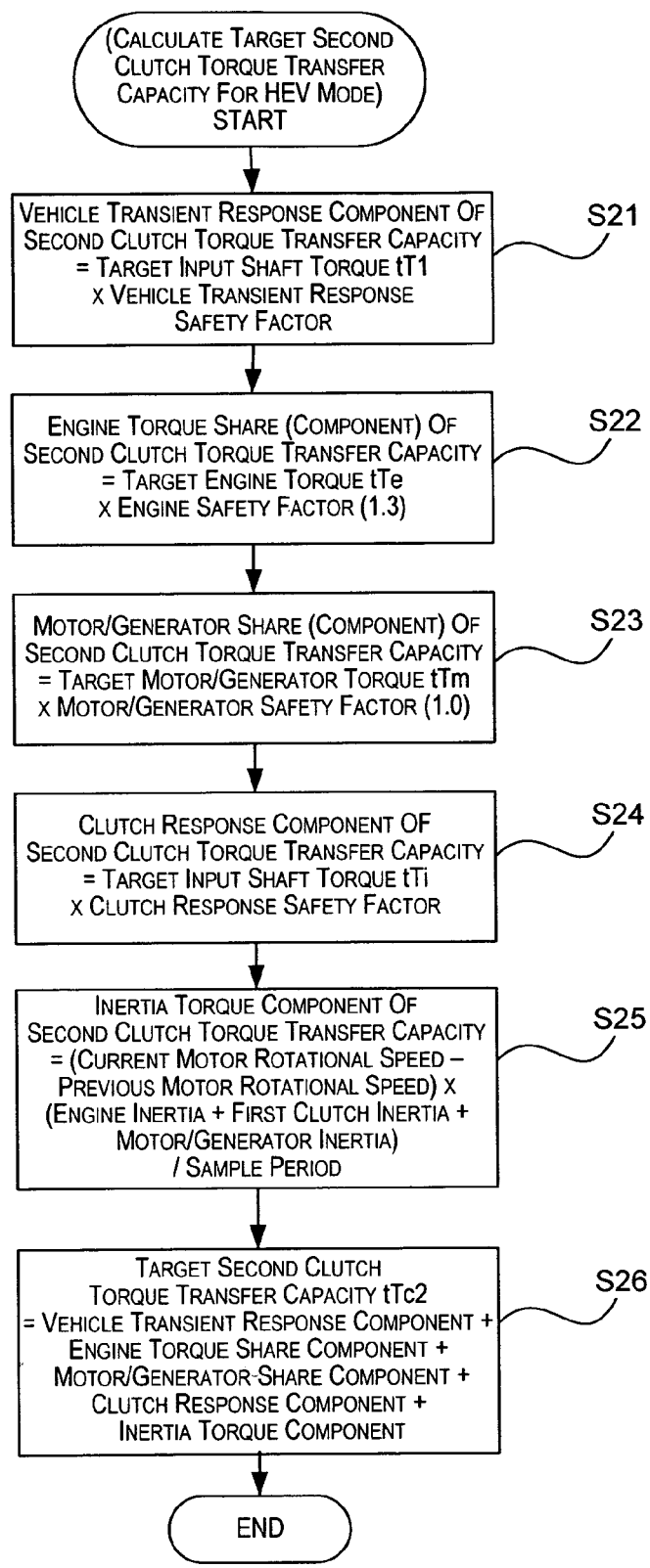
FIG. 7 is a flowchart showing a subroutine of the control process illustrated in FIG. 6 for calculating the target second clutch torque transfer capacity for the HEV mode in accordance with the illustrated embodiment of the present invention.

The method of deriving the target second clutch torque transfer capacity tTc2, particularly for the HEV mode, according to the present invention will now be discussed in detail below, referencing FIG. 7.

First, in step S21, the integrated controller 20 is configured to calculate the vehicle transient response component or portion of the second clutch torque transfer capacity tTc2 by multiplying the target input shaft torque tTi, which was derived by the abovementioned equation (1), by the vehicle transient response safety factor.

Next, in step S22, the integrated controller 20 is configured to calculate the engine torque share (engine torque component) of the second clutch torque transfer capacity by multiplying the target engine torque tTe, which was derived in the abovementioned equation (2), by the engine safety factor (e.g., 1.3).

Furthermore, in step S23, the integrated controller 20 is configured to calculate the motor/generator torque share (motor/generator torque component) of the second clutch torque transfer capacity by multiplying the target motor/generator torque tTm, which is derived as discussed later with reference to FIG. 15, by the motor/generator safety factor (e.g., 1.0).

Subsequently, in step S24, the integrated controller 20 is configured to calculate the clutch response component or portion of the second clutch torque transfer capacity by multiplying the target input shaft torque tTi, which was derived by the equation (1), by the clutch response safety factor.

Furthermore, in step S25, the integrated controller 20 is configured to calculate the inertia torque component or portion of the second clutch torque transfer capacity by the following calculation. More specifically, the integrated controller 20 is configured to calculate the motor/generator rotational speed variation of one calculation period by first subtracting the previous value of the motor/generator rotational speed Nm from its current value. Subsequently, the integrated controller 20 is configured to calculate the total inertia by summing the rotational inertia of the engine 1, the rotational inertia of the first clutch 6, and the rotational inertia of the motor/generator 5. Lastly, the integrated controller 20 is configured to calculate the inertia torque component of the second clutch torque transfer capacity by dividing the product of the motor/generator rotational speed variation and the total inertia by the calculation (sample) period.

In step S26, the integrated controller 20 is configured to set the target second clutch torque transfer capacity tTc2 to a sum value of the vehicle transient response component of the second clutch torque transfer capacity derived in step S21, the engine's torque share of the second clutch torque transfer capacity derived in step S22, the motor/generator torque share of the second clutch torque transfer capacity derived in step S23, the clutch response component of the second clutch torque transfer capacity derived in step S24, and the inertia torque component of the second clutch torque transfer capacity derived in step S25.

Referring back to FIG. 6, if it is determined in step S11 that the target drive mode is the HEV mode, and in step S12 that the current drive mode is the EV mode, i.e., that the mode is to be switched from the EV mode to the HEV mode and the engine 1 is started, then, in step S15, the integrated controller 20 is configured to determine whether the state of charge SOC (dischargeable electric power) of the battery 9 is less than the sum value of the EV potential drive force and the engine startup electric power. In other words, the integrated controller 20 is configured to determine whether there is a request for a large drive force for which the state of charge SOC (dischargeable electric power) of the battery 9 is insufficient. If there is a request for a large drive force for which the state of charge SOC (dischargeable electric power) of the battery 9 is insufficient (Yes in step S15), then, in step S16, the target clutch torque transfer capacities tTc1 and tTc2 of the first and second clutches 6 and 7 are respectively set to the target clutch torque transfer capacities for engine startup when the drive force is large.

When a large drive force is required, the control switches from the EV mode to the HEV mode and the engine 1 is started using the target clutch torque transfer capacities tTc1 and tTc2 for engine startup. These target clutch torque transfer capacities tTc1 and tTc2 for engine startup are determined as follows by executing the control programs shown in the flowchart of FIGS. 8 and 9.

Figure 8:
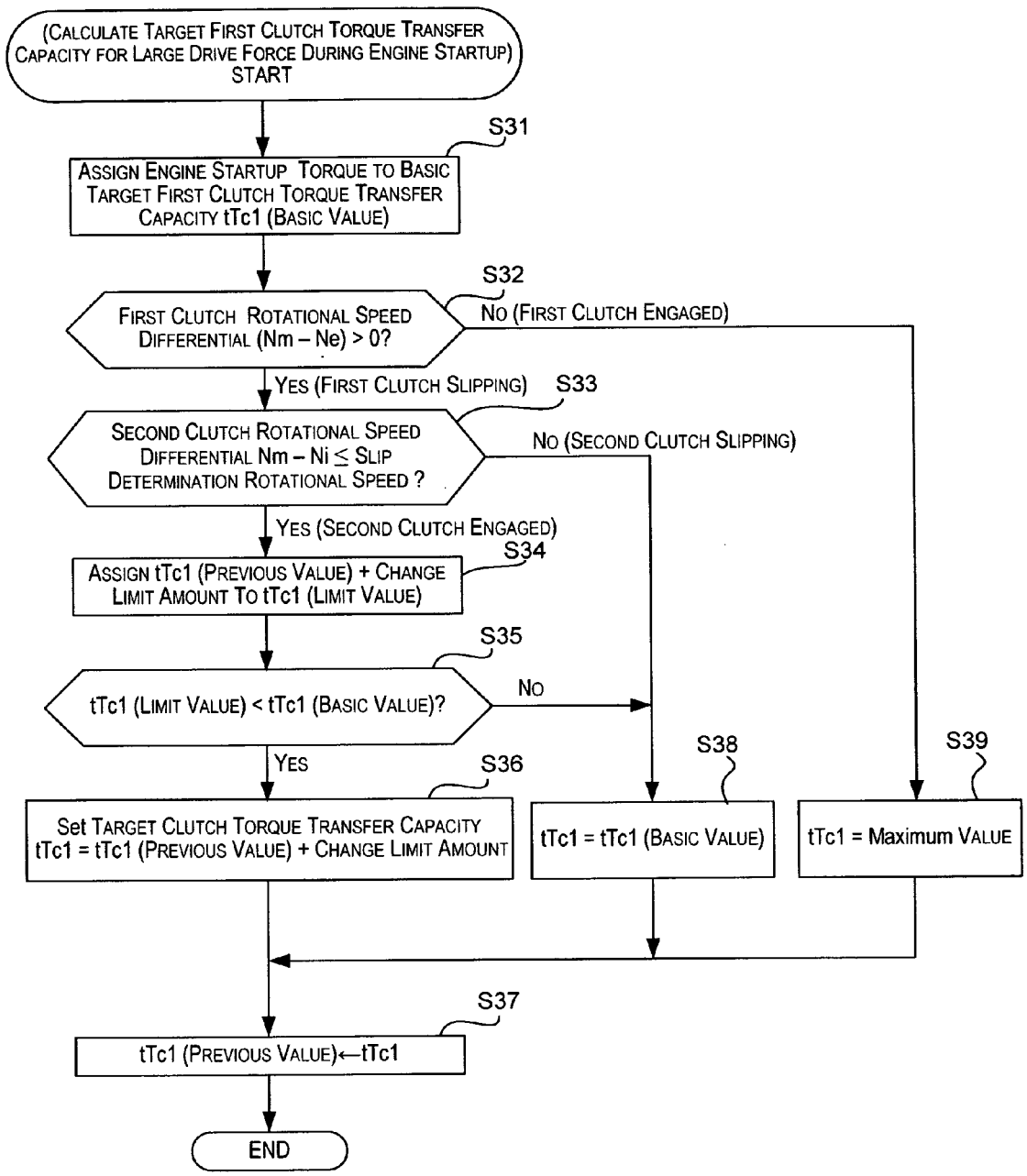
FIG. 8 is a flowchart showing a subroutine of the control process illustrated in FIG. 6 for calculating the target first clutch torque transfer capacity used when the drive force is large during engine startup in accordance with the illustrated embodiment of the present invention.

First, the process of calculating the engine startup target first clutch torque transfer capacity tTc1 when the drive force is large will be discussed below according to the present invention, based on FIG. 8, which explains that the first clutch 6 is engaged before the second clutch 7.

Consequently, first, in step S31, the engine startup torque needed for engine startup is assigned to the basic target first clutch torque transfer capacity tTc1 (basic value).

Next, in step S32, the subroutine determines whether the first clutch 6 is in a pre-engaged state, wherein the first clutch 6 has a front-rear rotational speed differential, or not (engaged state) by determining whether the first clutch 6 is generating a slip rotation (Nm−Ne). If the first clutch 6 is generating a slip rotation, then, in step S33, the subroutine determines whether the second clutch 7 is in the non slipping state or the slipping state by this time determining whether the rotational speed differential (Nm−Ni) of the second clutch 7 is less than the slip determination rotational speed.

If it is determined in step S32 that the first clutch 6 is in the pre-engaged state, wherein the first clutch 6 has a front-rear rotational speed differential, and in step S33 that the second clutch 7 is in the non-slipping state, then, in step S34, the subroutine sets the limit value tTc1 (limit value) of the target first clutch torque transfer capacity tTc1 to the sum of the previous value tTc1 (previous value) of the target first clutch torque transfer capacity tTc1 and a prescribed change limit amount.

In step S35, the subroutine determines whether this limit target first clutch torque transfer capacity tTc1 (limit value) is less than the basic target first clutch torque transfer capacity tTc1 (basic value) derived in step S31. In step S36, when the limit target first clutch torque transfer capacity tTc1 (limit value) is less than the basic target first clutch torque transfer capacity tTc1 (basic value), then the subroutine increases the target first clutch torque transfer capacity tTc1 in incremental steps, according to the prescribed change limit amount, by setting the target first clutch torque transfer capacity tTc1 to the sum of the previous value of the target first clutch torque transfer capacity tTc (previous value) and the prescribed change limit amount. In the last step S37, the target first clutch torque transfer capacity tTc1 is then set to the previous target first clutch torque transfer capacity tTc1 (previous value) for use in the next calculation.

If the subroutine has arrived at the determination in step S33 that the second clutch 7 has transitioned to the slipping state by increasing the target first clutch torque transfer capacity tTc1 in step S36, then, in step S38, the subroutine assigns the basic target first clutch torque transfer capacity tTc1 (basic value) derived in step S31 to the target first clutch torque transfer capacity tTc1, and sets the torque transfer capacity of the first clutch 6 to a value that corresponds to the engine startup torque. Subsequently, in step S37, the target first clutch torque transfer capacity tTc1 is set to tTc1 (previous value).

Furthermore, when arriving at the determination in step S32 that the first clutch 6 has engaged, in step S39, the target first clutch torque transfer capacity tTc1 is set to the maximum value, and the first clutch 6 is completely engaged.

Next, the process of calculating the engine startup target second clutch torque transfer capacity tTc2 when the drive force is large, which should be performed in step S16 of FIG. 6 as mentioned above, will be discussed in detail below according to the present invention, based on FIG. 9, which explains that the first clutch 6 is engaged before the second clutch 7.

Consequently, in step S41, the subroutine determines whether the first clutch 6 is engaged by determining whether the rotational speed differential (Nm−Ne) of the first clutch 6 is 0. If the first clutch 6 is engaged, then the subroutine further determines in step S42 whether the engine startup is complete.

If, for example, it is determined in step S41 that the first clutch 6 is not engaged, or that it is engaged and subsequently determined in step S42 that engine startup is incomplete, then control proceeds to step S43 and beyond, wherein slip control of the second clutch 7 is performed as below.

Namely, first, in step S43, the subroutine calculates the potential battery output component or portion of the motor torque that can be output by the motor/generator 5 when receiving the electric power that can be output from the battery by dividing the potential output electric power of the battery 9 (see FIG. 4; potential battery output of electric power) by the rotational speed Nm of the motor/generator 5, and adding the motor efficiency of the motor/generator 5 to this division result.

Subsequently, in step S44, the subroutine compares this potential battery output component of the motor torque with the motor/generator potential output torque that can be output by the motor/generator 5, and determines whether the potential battery output component of the motor torque is smaller than the motor/generator potential output torque.

If the potential battery output component of the motor torque is smaller than the motor/generator potential output torque, then, in step S45, the subroutine subtracts the engine startup torque from the smaller potential battery output component of the motor torque, and assigns this subtraction result to the maximum EV torque. Conversely, if the potential battery output component of the motor torque is larger than the motor/generator potential output torque, then, in step S46, the subroutine subtracts the engine startup torque from the smaller motor/generator potential output torque, and assigns this subtraction value to the maximum EV torque.

Next, in the step S47, the subroutine compares the maximum EV torque set as above with the target drive force tFo derived in step S5 of FIG. 5. If the maximum EV torque is greater than or equal to the target drive force tFo, then, in step S48, the subroutine assigns the smaller target drive force tFo to the engine startup basic target second clutch torque transfer capacity tTc2 (basic value). If the maximum EV torque is less than the target drive force tFo, then, in step S49, the subroutine assigns the smaller maximum EV torque to the engine startup basic target second clutch torque transfer capacity tTc2 (basic value).

Next, in step S50, the subroutine determines whether the second clutch 7 is slipping or not (engaged) by determining whether the rotational speed differential (Nm−Ni) of the second clutch 7 is greater than or equal to a slip determination rotational speed.

If the second clutch 7 is slipping, then, in step S51, the subroutine derives the second clutch slip correction torque (current value) so that the slippage (actual rotational speed differential) matches the target slippage (target rotational speed differential). The second clutch slip correction torque (current value) is calculated as follows: second clutch 7 slip correction torque (previous value)+(target rotational speed differential−actual rotational speed differential)×slip correction coefficient (gain).

Next, in step S52, the subroutine controls the torque transfer capacity of the second clutch 7 during engine startup by setting the engine startup target second clutch torque transfer capacity tTc2 to the sum of the abovementioned second clutch slip correction torque (current value) and the engine startup target second clutch torque transfer capacity tTc2 (basic value), thereby maintaining the second clutch 7 in the target slipping state and setting the engine startup target second clutch torque transfer capacity tTc2 to a value that is more than zero and less than the target motor/generator torque tTm.

Furthermore, if it is determined in step S50 that the second clutch 7 is in the engaged state, then, in step S57, the subroutine derives a current second clutch slip correction torque (current value). The second clutch slip correction torque (current value) is calculated by subtracting a slip increase torque from the previous second clutch slip correction torque (previous value). Next, this current second clutch slip correction torque (current value) is used in step S52 to calculate the engine startup target second clutch torque transfer capacity tTc2. The subroutine then performs slip control, wherein the torque transfer capacity of the second clutch 7 is reduced, and the second clutch 7 transitions to the slipping state so as to achieve the abovementioned target slippage. Thereby, the target slipping state of the second clutch 7 is maintained by controlling the torque transfer capacity thereof during engine startup such that the engine startup target second clutch torque transfer capacity tTc2 is set to a value that is more than zero and less than the target motor/generator torque tTm.

Incidentally, as mentioned above in FIG. 9, the second clutch 7 is caused to transition to the target slipping state during engine startup by controlling the torque transfer capacity of the second clutch 7. However, the second clutch 7 can also be caused to transition to the target slipping state by controlling the torque of the motor/generator 5 as discussed later referencing FIG. 16. Also the second clutch 7 can also be caused to transition to the target slipping state by controlling the torque transfer capacity of the second clutch 7 in parallel with the torque of the motor/generator 5.

Furthermore, when the second clutch 7 is caused to transition to the target slipping state, the determination of whether to control the torque transfer capacity of the second clutch 7, the torque of the motor/generator 5, or both in parallel, is made in accordance with the object of prioritization, i.e., shock reduction or improved engine startup response, due to, for example, a vehicle acceleration request, an operation state, or an EV mode to HEV mode switching request.

If it is determined in step S41 that the first clutch 6 is engaged, and in step S42 that engine startup is complete, then control proceeds to step S53 and beyond, wherein the second clutch 7 is engaged as follows.

In step S53, the subroutine adds a slip decreased torque to the second clutch slip correction torque (previous value). Next, in step S54, the subroutine advances the engagement of the second clutch 7 by setting the target second clutch torque transfer capacity tTc2 to the sum of the second clutch slip correction torque (previous value) and the target drive torque transfer component.

Thereby, the rotational speed differential $\Delta Nc$ (Nm−Ni) of the second clutch 7 is reduced. However, in step S55, the subroutine determines whether the rotational speed differential $\Delta Nc$ of the second clutch 7 is greater than or equal to the prescribed rotational speed $\Delta Nc1$.

The prescribed slip rotational speed differential $\Delta Nc1$ will now be explained. As is true for all clutches, a change friction characteristics of the clutch coefficient of friction $\mu$ with respect to the slip rotational speed differential $\Delta Nc$ (Nm−Ni) of the second clutch 7 occurs as follows. Normally, over the range of slip rotational speeds that approximately encompass the slip rotational speeds where the coefficient of friction $\mu$ is at its maximum, the percentage change of the clutch coefficient of friction $\mu$ with respect to the slip rotational speed is a relatively large region in which the coefficient of friction is unstable. Furthermore, when the range of the slip rotational speeds goes beyond that and the slippage is large, i.e., greater than or equal to the abovementioned prescribed slip rotational speed differential $\Delta Nc1$, then the percentage change of the clutch coefficient of friction $\mu$ with respect to the slip rotational speed is a relatively small region where the coefficient of friction is stable.

If, for example, the torque transfer capacity tTc2 of the second clutch 7 is controlled so that the slip rotational speed of the second clutch 7 reaches the target value, as described in steps S53 and S54, in the unstable coefficient of friction region where $\Delta Nc<\Delta Nc1$, then the coefficient of friction of the second clutch 7 changes greatly with just a slight change in the torque, and the torque transfer capacity of the second clutch 7 also changes greatly, which generates clutch judder. Therefore, it is preferable to perform the abovementioned feedback control in the stable coefficient of friction region where $\Delta Nc \geqq \Delta Nc1$, and to perform feedforward control in the unstable coefficient of friction region, where $\Delta Nc < \Delta Nc1$. Likewise, if feedback control of the target motor/generator torque tTm (discussed in detail in FIG. 16) is performed so that the slip rotational speed of the second clutch 7 reaches the target value in the unstable coefficient of friction region where $\Delta Nc < \Delta Nc1$, then the coefficient of friction of the second clutch 7 changes greatly with just a slight change in the torque, and the torque transfer capacity of the second clutch 7 also changes greatly, which generates clutch judder. Therefore, it is preferable to perform the abovementioned feedback control in the stable coefficient of friction region where $\Delta Nc \geqq \Delta Nc1$, and to perform feedforward control in the unstable coefficient of friction region, where $\Delta Nc < \Delta Nc1$.

Figure 9:
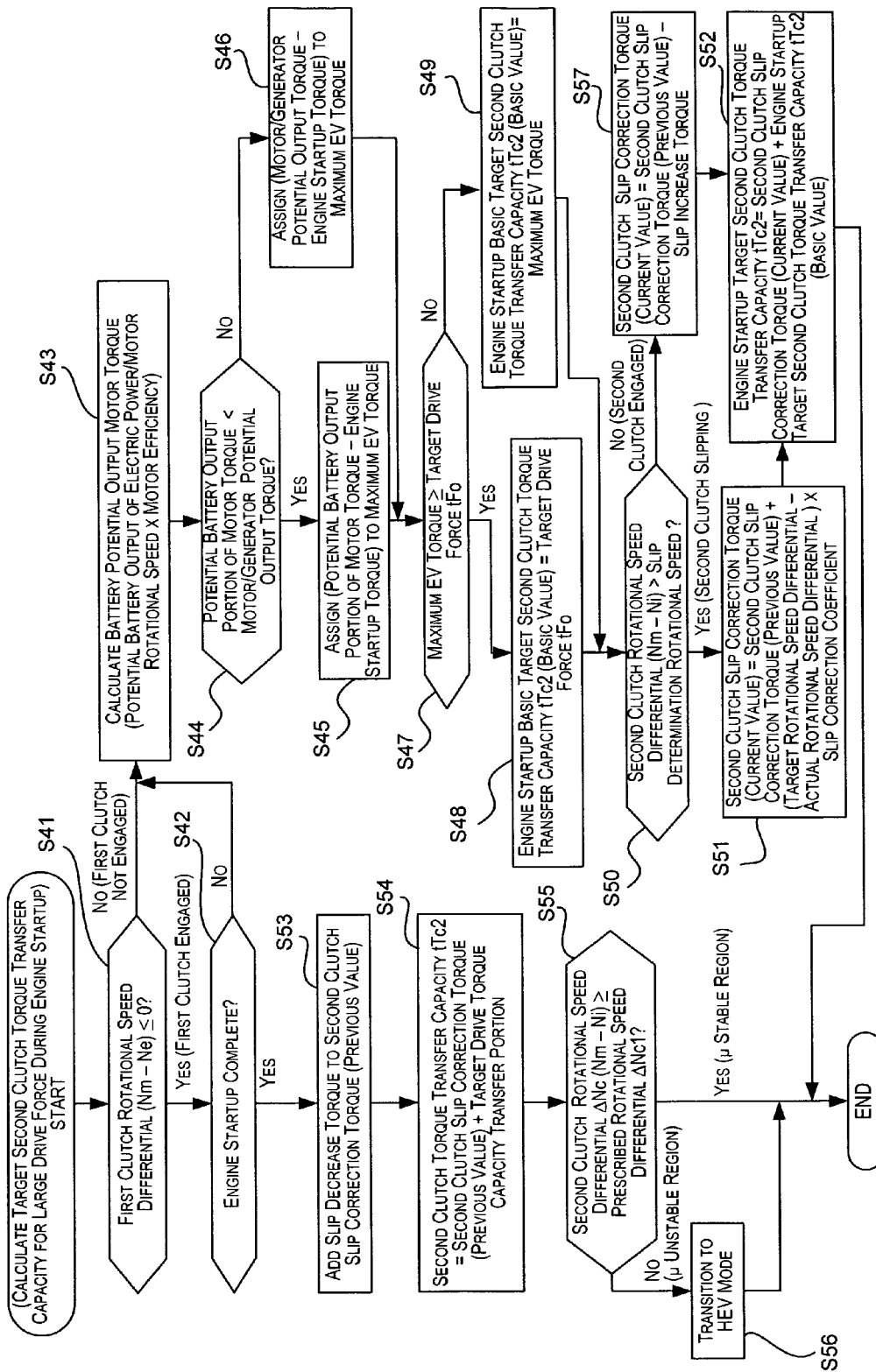
FIG. 9 is a flowchart showing a subroutine of the control process illustrated in FIG. 6 for calculating the target second clutch torque transfer capacity used when the drive force is large during engine startup in accordance with the illustrated embodiment of the present invention.

From the viewpoint of the present embodiment, in step S55 of FIG. 9, the integrated controller 20 is configured to determine whether the coefficient of friction µ is in the stable region or in the unstable region by determining whether the slip rotational speed differential $\Delta Nc$ of the second clutch 7 is greater than or equal to the prescribed rotational speed differential $\Delta Nc1$. In the µ stable region, the engagement of the second clutch 7 is advanced under feedback control by steps S53 and S54. If the coefficient of friction µ enters the unstable region by this advancing of engagement, then control proceeds to step S56, wherein the drive mode transitions to the HEV mode, and the torque transfer capacity tTc2 of the second clutch 7 as well as the target motor/generator torque tTm are determined by feedforward control in this mode.

Even if it is determined in step S12 of FIG. 6 that the current mode is the EV mode and that the drive mode is to be switched from the EV mode to the HEV mode, if it is determined in step S15 that a request for a small drive force is in progress such that the state of charge SOC (dischargeable electric power) of the battery 9 is sufficient, then in step S17, the subroutine sets the target clutch transfer torque capacities tTc1 and tTc2 of the first and second clutches 6 and 7 to the engine startup target clutch transfer torque capacities when the drive force is small.

Figure 10:
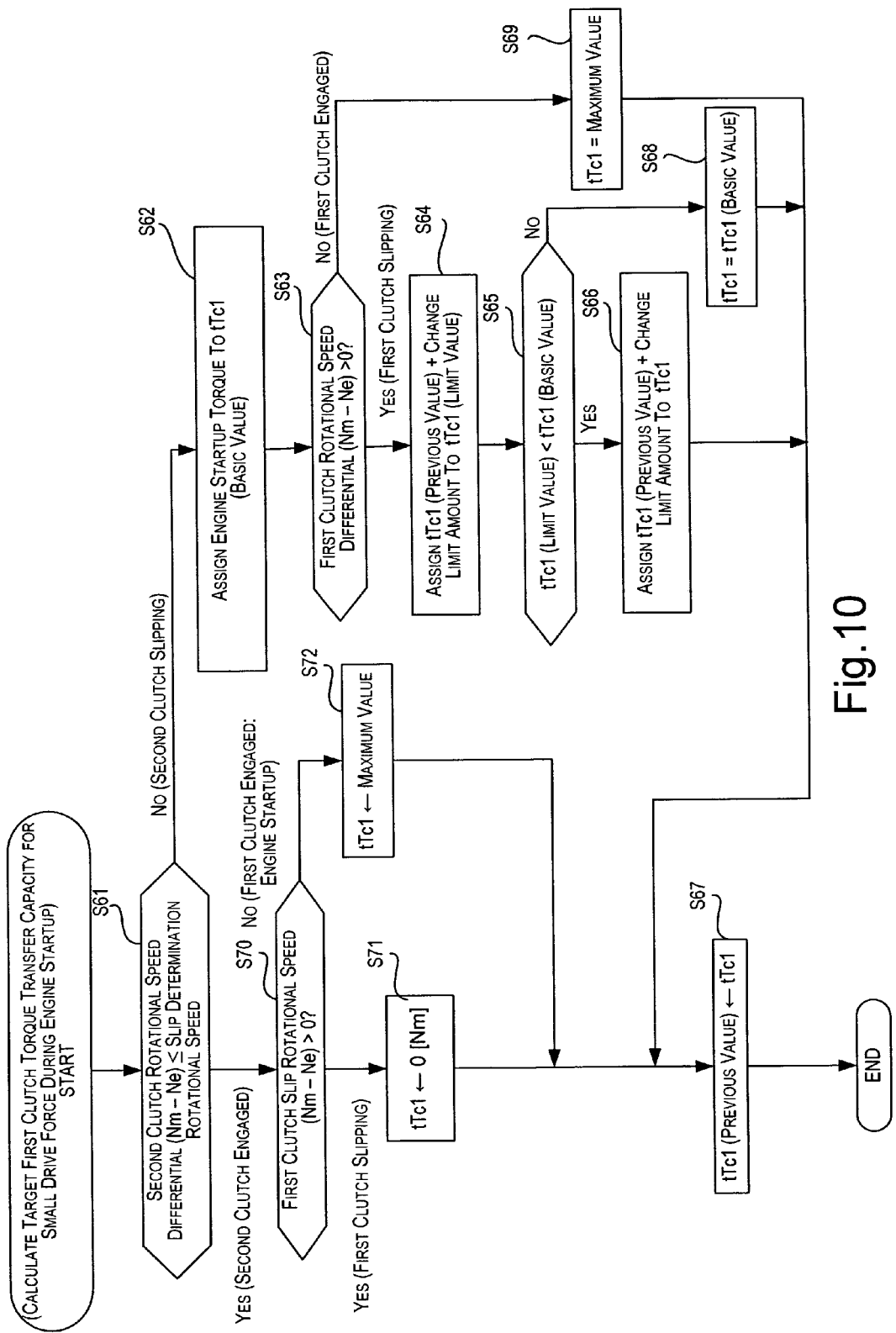
FIG. 10 is a flowchart showing a subroutine of the control process illustrated in FIG. 6 for calculating the target first clutch torque transfer capacity used when drive force is small during engine startup in accordance with the illustrated embodiment of the present invention.
Figure 11:
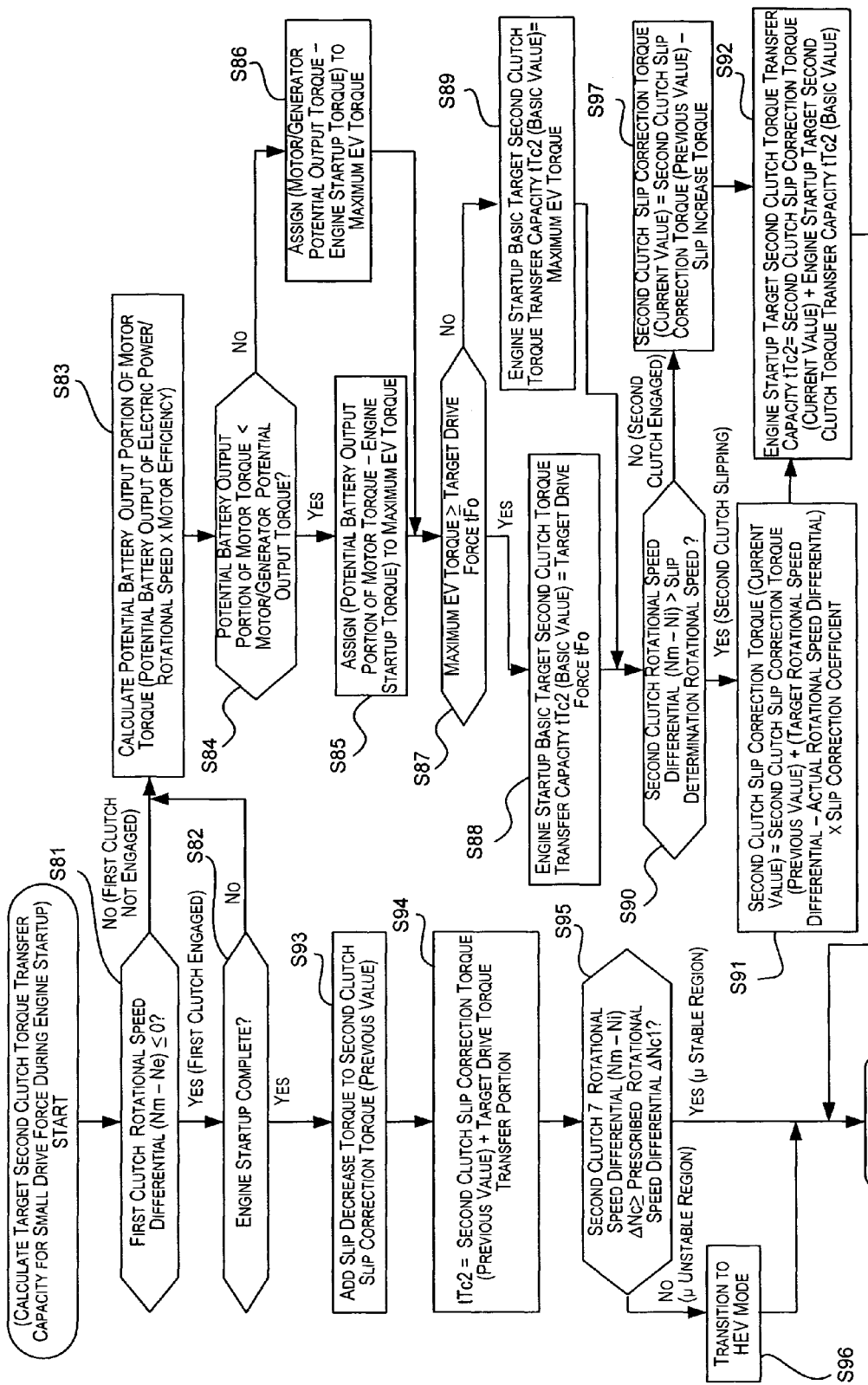
FIG. 11 is a flowchart showing a subroutine of the control process illustrated in FIG. 6 for calculating the target second clutch torque transfer capacity used when drive force is small during engine startup in accordance with the illustrated embodiment of the present invention.

The engine startup target clutch transfer torque capacities tTc1 and tTc2 when the drive force is small are derived as follows by executing the control programs shown in FIG. 10 and FIG. 11, respectively.

First, the process of calculating the engine startup target first clutch torque transfer capacity tTc1 when the drive force is small will be discussed below according to the present invention, based on FIG. 10, which explains that the first clutch 6 is engaged before the second clutch 7.

Consequently, in step S61, the subroutine determines whether the second clutch 7 is engaged or slipping by determining whether the rotational speed differential (Nm–Ni) of the second clutch 7 is less than a slip determination rotational speed.

If the second clutch 7 is slipping, then, in step S62, the subroutine assigns the engine startup torque needed at engine startup to the basic target first clutch torque transfer capacity tTc1 (basic value).

Next, in step S63, the subroutine this time determines whether the first clutch 6 is in the pre-engaged state, wherein the first clutch 6 has a front-rear rotational speed differential, or not (the engaged state) by determining whether the first clutch 6 is generating slip rotation (Nm–Ne). If the first clutch 6 is generating a slip rotation, then, in step S64, the subroutine sets the limit target first clutch torque transfer capacity tTc1 (limit value) of the target first clutch torque transfer capacity tTc1 to the sum of the previous target first clutch torque transfer capacity value tTc1 (previous value) of the target first clutch torque transfer capacity tTc1 and a prescribed change limit amount.

In step S65, the subroutine determines whether this limit value of target first clutch torque transfer capacity tTc1 (limit value) is less than the basic target first clutch torque transfer capacity tTc1 (basic value) derived in step S62. In step S66, when the limit target first clutch torque transfer capacity tTc1 (limit value) is less than the basic target first clutch torque transfer capacity tTc1 (basic value), the subroutine increases the target first clutch torque transfer capacity tTc1 in incremental steps, according to the prescribed change limit amount, by setting the target first clutch torque transfer capacity tTc1 to the sum of the previous target first clutch torque transfer capacity tTc1 (previous value) and the prescribed change limit amount. In the last step S67, the target first clutch torque transfer capacity tTc1 is set to the previous target first clutch torque transfer capacity tTc1 (previous value) for the next calculation.

If the subroutine has arrived at the determination in step S65 that the limit target first clutch torque transfer capacity tTc1 (limit value) has become greater than or equal to the basic target first clutch torque transfer capacity tTc1 (basic value) due to the increasing of the target first clutch torque transfer capacity tTc1 in step S66, then in step S68, the subroutine assigns the basic target first clutch torque transfer capacity tTc1 (basic value) derived in step S62 to the target first clutch torque transfer capacity tTc1, and sets the torque transfer capacity of the first clutch 6 to a value that corresponds to the engine startup torque. Subsequently, in step S67, the target first clutch torque transfer capacity tTc1 is set to the previous target first clutch torque transfer capacity tTc1 (previous value).

Furthermore, when arriving at the determination in step S63 that the first clutch 6 has engaged, in step S69, the target first clutch torque transfer capacity tTc1 is set to the maximum value, and the first clutch 6 is completely engaged.

The subroutine advances the full engagement of the first clutch 6 by repeatedly executing the abovementioned processes as long as it is determined in step S61 that the second clutch 7 is in the slipping state. Furthermore, if it is determined in step S61 that the second clutch 7 has engaged, then control proceeds to step S70 wherein the subroutine determines whether the first clutch 6 is in the pre-engaged state and has a front-rear rotational speed differential, or not (engaged state) by determining whether the first clutch 6 is generating a slip rotation (Nm–Ne).

If the first clutch 6 is generating a slip rotation, then, in step S71, the subroutine sets the target first clutch torque transfer capacity tTc1 to 0. Furthermore, if the first clutch 6 is engaged, then, in step S72, the subroutine sets the target first clutch torque transfer capacity tTc1 to the maximum value, and subsequently, in step S67, sets the target first clutch torque transfer capacity tTc1 to the previous target first clutch torque transfer capacity tTc1 (previous value).

Next, the process of calculating the engine startup target second clutch torque transfer capacity tTc2 when the drive force is small, which should be performed in step S17 of FIG. 6 as mentioned above, will be discussed in detail below according to the present invention, based on FIG. 11, which explains that the first clutch 6 is engaged before the second clutch 7.

Consequently, in step S81, the subroutine determines whether the first clutch 6 is engaged by determining whether the rotational speed differential (Nm–Ne) of the first clutch 6 is 0. If the first clutch 6 is engaged, then the subroutine further determines in step S82 whether the engine startup is complete.

If, for example, it is determined in step S81 that the first clutch 6 is not engaged, or that it is engaged and subsequently determined in step S82 that engine startup is incomplete, then control proceeds to step S83 and beyond, wherein slip control of the second clutch 7 is performed as below.

Namely, first, in step S83, the subroutine calculates the potential battery output component of the motor torque that can be output by the motor/generator 5 when receiving the electric power that can be output from the battery by dividing the potential output electric power of the battery 9 (see FIG. 4; potential battery output of electric power) by the rotational speed Nm of the motor/generator 5, and adding the motor efficiency of the motor/generator 5 to this division result.

Subsequently, in step S84, the subroutine compares this potential battery output component of the motor torque with the motor/generator potential output torque that can be output by the motor/generator 5, and determines whether the potential battery output component of the motor torque is smaller than the motor/generator potential output torque.

If the potential battery output component of the motor torque is smaller than the motor/generator potential output torque, then, in step S85, the subroutine subtracts the engine startup torque from the smaller potential battery output component of the motor torque, and assigns this subtraction result to the maximum EV torque. Conversely, if the potential battery output component of the motor torque is larger than the motor/generator potential output torque, then, in step S86, the subroutine subtracts the engine startup torque from the smaller motor/generator potential output torque, and assigns this subtraction value to the maximum EV torque.

Next, in the step S87, the subroutine compares the maximum EV torque set as above with the target drive force tFo derived in step S5 of FIG. 5. If the maximum EV torque is greater than or equal to the target drive force tFo, then, in step S88, the subroutine assigns the smaller target drive force tFo to the engine startup basic target second clutch torque transfer capacity tTc2 (basic value). If the maximum EV torque is less than the target drive force tFo, then, in step S89, the subroutine assigns the smaller maximum EV torque to the engine startup basic target second clutch torque transfer capacity tTc2 (basic value).

Next, in step S90, the subroutine determines whether the second clutch 7 is slipping or not (engaged) by determining whether the rotational speed differential (Nm−Ni) of the second clutch 7 is greater than or equal to the slip determination rotational speed.

If the second clutch 7 is slipping, then, in step S91, the subroutine derives the second clutch slip correction torque (current value) so that the slippage (actual rotational speed differential) matches the target slippage (target rotational speed differential). The second clutch slip correction torque (current value) is calculated as follows: second clutch 7 slip correction torque (previous value)+(target rotational speed differential−actual rotational speed differential)×slip correction coefficient (gain).

Next, in step S92, the subroutine controls the torque transfer capacity of the second clutch 7 during engine startup by setting the engine startup target second clutch torque transfer capacity tTc2 to the sum of the second clutch slip correction torque (current value) and the engine startup target second clutch torque transfer capacity tTc2 (basic value), thereby maintaining the second clutch 7 in the target slipping state and setting the engine startup target second clutch torque transfer capacity tTc2 to a value that is more than zero and less than the target motor/generator torque tTm.

Furthermore, if it is determined in step S90 that the second clutch 7 is in the engaged state, then, in step S97, the subroutine derives the second clutch slip correction torque (current value). The second clutch slip correction torque (current value) is calculated by subtracting a slip increase torque from the previous second clutch slip correction torque (previous value). Next, this current second clutch slip correction torque (current value) is used in step S92 to calculate the engine startup target second clutch torque transfer capacity tTc2. The subroutine then performs slip control, wherein the torque transfer capacity of the second clutch 7 is reduced, and the second clutch 7 transitions to the slipping state so as to achieve the abovementioned target slippage. Thereby, the target slipping state of the second clutch 7 is maintained by controlling the torque transfer capacity thereof during engine startup, and the engine startup target second clutch torque transfer capacity tTc2 is set to a value that is more than zero and less than the target motor/generator torque tTm.

Incidentally, as mentioned above in FIG. 11, the second clutch 7 is caused to transition to the target slipping state during engine startup by controlling the torque transfer capacity of the second clutch 7. However, the second clutch 7 can also be caused to transition to the target slipping state by controlling the target torque of the motor/generator 5 as discussed later referencing FIG. 16. In addition, the second clutch 7 can also be caused to transition to the target slipping state by controlling the torque transfer capacity of the second clutch 7 in parallel with the torque of the motor/generator 5.

Furthermore, when the second clutch 7 is caused to transition to the target slipping state, the determination of whether to control the torque transfer capacity of the second clutch 7, the torque of the motor/generator 5, or both in parallel, is made in accordance with the object of prioritization, i.e., shock reduction or improved engine startup response, based on the cause of, for example, a vehicle acceleration request, an operation state, or an EV mode to HEV mode switching request.

If it is determined in step S81 that the first clutch 6 is engaged, and in step S82 that engine startup is complete, then control proceeds to step S93 and beyond, wherein the second clutch 7 is engaged as follows.

In step S93, the subroutine adds a slip decreased torque to the second clutch slip correction torque (previous value). Next, in step S94, the subroutine advances the engagement of the second clutch 7 by setting the target second clutch torque transfer capacity tTc2 to the sum of the second clutch slip correction torque (previous value) and the target drive torque transfer component.

Thereby, the rotational speed differential ΔNc (Nm−Ni) of the second clutch 7 is reduced. However, in step S95, the subroutine determines whether the coefficient of friction μ is in the stable region or not (unstable region) by determining whether the rotational speed differential ΔNc of the second clutch 7 is greater than or equal to a set rotational speed ΔNc1.

If the coefficient of friction μ is in the stable region, then the engagement of the second clutch 7 is advanced under feedback control by steps S93 and S94. If the coefficient of friction μ enters the unstable region by this advancing of engagement, then control proceeds to step S96, wherein the drive mode transitions to the HEV mode, and the torque transfer capacity tTc2 of the second clutch 7 as well as the target motor/generator torque tTm are determined by feedforward control in this mode.

By issuing commands in step S9 of FIG. 5 to the first clutch 6 and the second clutch 7, as shown in FIG. 4, with the command values of the engine startup target first clutch torque transfer capacity tTc1 and the engine startup target second clutch torque transfer capacity tTc2, which were determined in step S16 (refer to FIG. 8 and FIG. 9 for details) and step S17 (refer to FIG. 10 and FIG. 11 for details) in FIG. 6 as discussed above, the subroutine controls the engagement of the clutches 6 and 7 so that they reach the target first clutch torque transfer capacity tTc1 and the target second clutch torque transfer capacity tTc2, respectively.

If it is determined in step S11 of FIG. 6 that the target drive mode is the EV mode, and in step S13 that the current drive mode is the HEV mode, i.e., if switching the drive mode from the HEV mode to the EV mode, then, in step S18, the target transfer torque capacities tTc1 and tTc2 of the first clutch 6 and the second clutch 7 are set to the target values for use when transitioning to the EV mode.

By issuing commands in step S9 of FIG. 5 to the first clutch 6 and the second clutch 7, as shown in FIG. 4, with the command values of the target first clutch torque transfer capacity tTc1 and the target second clutch torque transfer capacity tTc2, which were determined in step S16 (refer to FIG. 8 for details) and step S17 as discussed above, the integrated controller 20 is configured to control the engagement of the clutches 6 and 7 so that the torque transfer capacities of the first and second clutches 6 and 7 reach the target first clutch torque transfer capacity tTc1 and the target second clutch torque transfer capacity tTc2, respectively.

Referring back to FIG. 6, if it is determined in step S11 that the target drive mode is the EV mode (No in step S11), and in step S13 that the current drive mode is the HEV mode (Yes in step S13), i.e., if switching the drive mode from the HEV mode to the EV mode, then, in step S18, the target clutch torque transfer capacities tTc1 and tTc2 of the first clutch 6 and the second clutch 7 are set to the target values for use when transitioning from the HEV mode to the EV mode.

Figure 12:
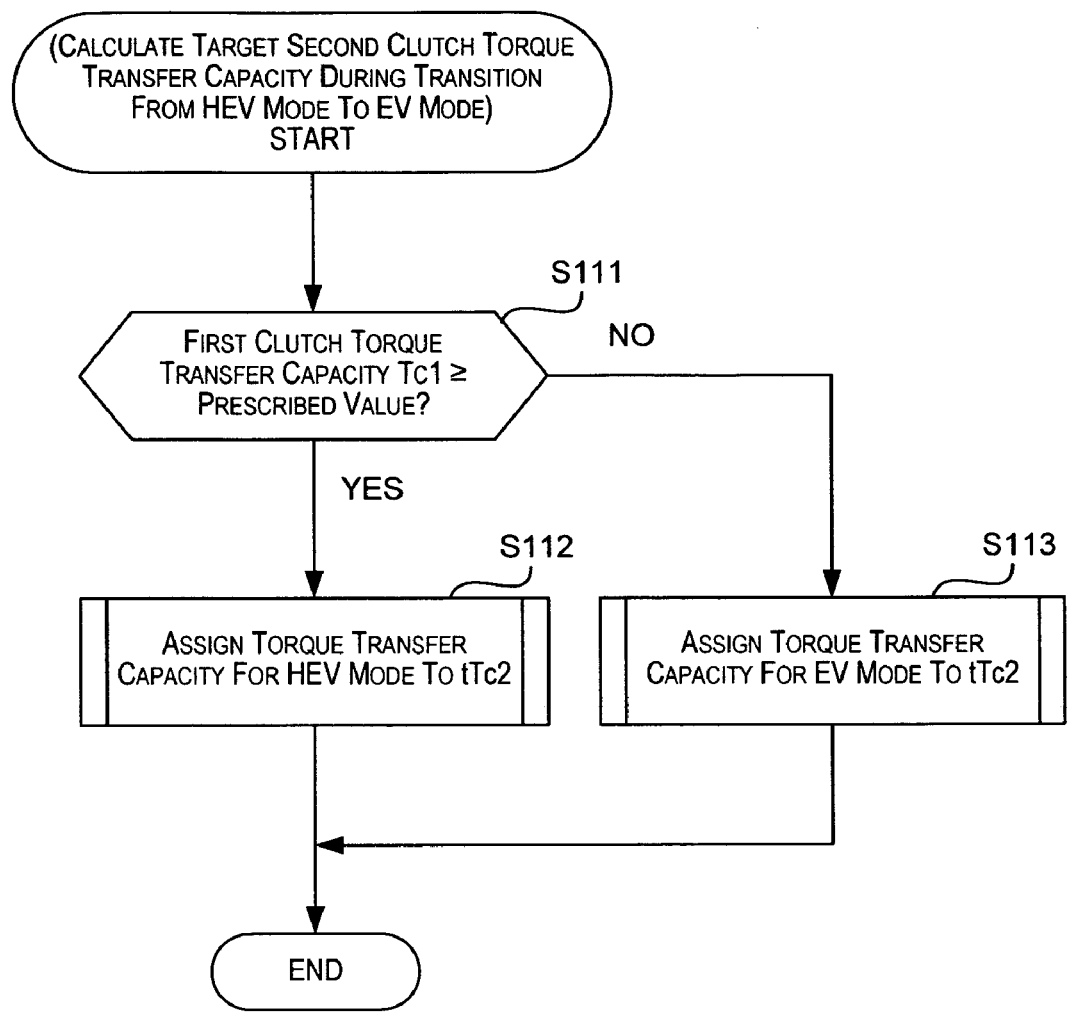
FIG. 12 is a flowchart showing a subroutine of the control process illustrated in FIG. 6 for calculating the target second clutch torque transfer capacity during transition from the HEV mode to the EV mode in accordance with the illustrated embodiment of the present invention.

The method of determining the target second clutch torque transfer capacity tTc2, particularly for use when switching from the HEV mode to the EV mode, according to the present invention will now be discussed in detail, referencing FIG. 12.

In step S111, the integrated controller 20 is configured to determine whether the switch of the drive mode from the HEV mode to the EV mode is incomplete by determining whether the actual torque transfer capacity Tc1 of the first clutch 6 is greater than or equal to a prescribed value for determining that the switch is incomplete.

When the actual torque transfer capacity Tc1 of the first clutch 6 is greater than or equal to the prescribed value in step S111, the switch from the HEV mode to the EV mode is still incomplete, and control therefore proceeds to step S112, wherein the integrated controller 20 is configured to set the target second clutch torque transfer capacity tTc2 to the torque transfer capacity for the HEV mode, which was derived as discussed earlier with reference to FIG. 7.

Figure 13:
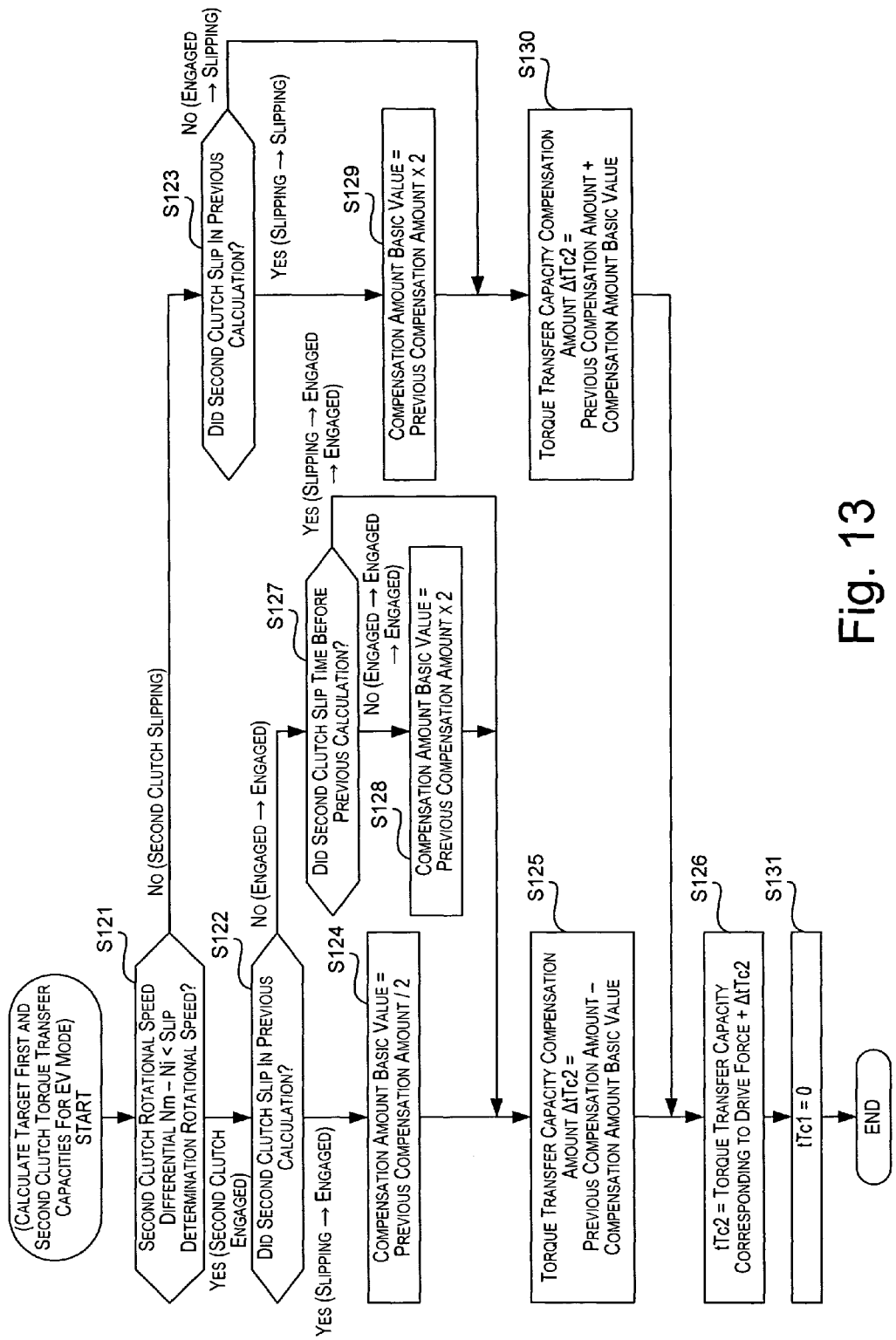
FIG. 13 is a flowchart showing a subroutine of the control process illustrated in FIG. 6 for calculating the target first and second clutch transfer capacities for the EV mode in accordance with the illustrated embodiment of the present invention.

On the other hand, if the integrated controller 20 determines in step S111 that the actual torque transfer capacity Tc1 of the first clutch 6 is less than the prescribed value, then the switch from the HEV mode to the EV mode is complete, and control therefore proceeds to step S113, wherein the integrated controller 20 is configured to set the target second clutch torque transfer capacity tTc2 to the torque transfer capacity for the EV mode, which is derived as discussed later referencing FIG. 13.

Referring back to FIG. 6, if it is determined in step S11 that the target drive mode is the EV mode (No in step S11), and in step S13 that the current drive mode is the EV mode (No in step S13), i.e., if the EV mode is to be maintained, then, in step S19, the integrated controller 20 is configured to set the target torque transfer capacity tTc2 of the second clutch 7 to the target value for the EV mode, and to set the target torque transfer capacity tTc1 of the first clutch 6 to 0 for the EV mode.

The target first clutch torque transfer capacity tTc1 and the target second clutch torque transfer capacity tTc2 for the EV mode are derived as follows by executing the control program shown in the flowchart of FIG. 13.

First, in step S121 in FIG. 13, the integrated controller 20 is configured to determine whether the second clutch 7 is currently in the engaged state or in the slipping state by determining whether the slip rotational speed differential (=Nm−Ni) of the second clutch 7 is less than the slip determination rotational speed.

In either determination result in step S121, the integrated controller 20 is configured to determine in step S122 and step S123 whether the second clutch 7 was determined to be in the slipping state in the previous calculation.

If it is determined in step S121 that the second clutch 7 is in the engaged state in the current calculation (Yes in step S121), and in step S122 that the second clutch 7 was in the slipping state in the previous calculation (Yes in step S122), i.e., if the second clutch 7 changed from the slipping state to the engaged state, then it is the point in time immediately after the second clutch 7 has reached the torque transfer capacity, i.e., the torque transfer capacity that corresponds to the drive force to be transmitted, at which the second clutch 7 just barely does not slip. Thus, in step S124, the integrated controller 20 is configured to set a torque transfer capacity compensation amount basic value of the second clutch 7 to half of the previous compensation amount. Furthermore, in step S125, the integrated controller 20 is configured to calculate a torque transfer capacity compensation amount $\Delta tTc2$ by subtracting the abovementioned torque transfer capacity compensation amount basic value from the previous compensation amount. Next, in step S126, the integrated controller 20 is configured to set the target torque transfer capacity tTc2 of the second clutch 7 to the sum of the torque transfer capacity, which corresponds to the drive force tFo, and the torque transfer capacity compensation amount $\Delta tTc2$. Finally, in step S131, the integrated controller 20 is configured to set the target torque transfer capacity tTc1 of the first clutch 6 to 0.

If it is determined in step S121 that the second clutch 7 is in the engaged state (Yes in step S121), and in step S122 that the second clutch 7 was not in the slipping state in the previous calculation (No in step S121), i.e., that the second clutch 7 has maintained the engaged state in the previous and current calculations, then, in step S127, the integrated controller 20 is configured to determine whether the second clutch 7 was in the slipping state in the calculation that was made the calculation period before the last calculation period.

If it is determined in step S127 that the second clutch 7 was not in the slipping state in the calculation that was made the time before last, i.e., that the second clutch 7 has maintained the engaged state in the calculation that was made the calculation period before the last calculation period, in the previous calculation, and in the current calculation (No in step S127), then the torque transfer capacity of the second clutch 7 is excessive with respect to the drive force to be transmitted. Thus, in step S128, the integrated controller 20 is configured to set the torque transfer capacity compensation amount basic value of the second clutch 7 to twice the previous compensation amount. Furthermore, in step S125, the integrated controller 20 is configured to calculate the torque transfer capacity compensation amount $\Delta tTc2$ by subtracting the abovementioned torque transfer capacity compensation amount basic value from the previous compensation amount. Next, in step S126, the integrated controller 20 is configured to set the target torque transfer capacity tTc2 of the second clutch 7 to the sum of the torque transfer capacity, which corresponds to the drive force tFo, and the abovementioned torque transfer capacity compensation amount ΔtTc2. Finally, in step S131, the integrated controller 20 is configured to set the target torque transfer capacity tTc1 of the first clutch 6 to 0.

However, if it is determined in step S127 that the second clutch 7 was in the slipping state in the calculation that was made the time before last, i.e., if the second clutch 7 was in the slipping state in the calculation that was made the calculation period before the last calculation period, and the second clutch 7 was then in the engaged state for the following two calculations (the previous calculation and the current calculation) (Yes in step S127), then the torque transfer capacity of the second clutch 7 is somewhat large with respect to the drive force to be transmitted. Therefore, without correcting the torque transfer capacity compensation amount basic value of the second clutch 7 as in step S124 and step S128, control proceeds to step S125, wherein the integrated controller 20 is configured to calculate the torque transfer capacity compensation amount ΔtTc2 by subtracting the abovementioned torque transfer capacity compensation amount basic value from the previous compensation amount. Next, in step S126, the integrated controller 20 is configured to set the target torque transfer capacity tTc2 of the second clutch 7 to the sum of the torque transfer capacity, which corresponds to the drive force tFo, and the abovementioned torque transfer capacity compensation amount ΔtTc2. Finally, in step S131, the integrated controller 20 is configured to set the target torque transfer capacity tTc1 of the first clutch 6 to 0.

If it is determined in step S121 that the second clutch 7 is in the slipping state (No in step S121), and in step S123 that the second clutch 7 was in the slipping state in the previous calculation (Yes in step S123), i.e., if the second clutch 7 has maintained the slipping state for two calculation, then the torque transfer capacity of the second clutch 7 is greatly insufficient with respect to the drive force to be transmitted. Therefore, in step S129, the integrated controller 20 is configured to set the torque transfer capacity compensation amount basic value of the second clutch 7 to twice the previous compensation amount. In step S130, the integrated controller 20 is configured to calculate the torque transfer capacity compensation amount ΔtTc2 by calculating the sum of the previous compensation amount and the abovementioned torque transfer capacity compensation amount basic value. Next, in step S126, the integrated controller 20 is configured to set the target torque transfer capacity tTc2 of the second clutch 7 to the sum of the torque transfer capacity, which corresponds to the drive force tFo, and the abovementioned torque transfer capacity compensation amount ΔtTc2. Finally, in step S131, the integrated controller 20 is configured to set the target torque transfer capacity tTc1 of the first clutch 6 to 0.

However, if it is determined in step S121 that the second clutch 7 is in the slipping state (No in step S121), and in step S123 that the second clutch 7 was not in the slipping state in the previous calculation (No in step S121), i.e., that the second clutch 7 has transitioned from the engaged state to the slipping state, then the torque transfer capacity of the second clutch 7 is somewhat insufficient with respect to the drive force to be transmitted. Thus, without correcting the torque transfer capacity compensation amount basic value as in step S129, the integrated controller 20 is configured to determine the torque transfer capacity compensation amount ΔtTc2 in step S130 by calculating the sum of the previous compensation amount and the torque transfer capacity compensation amount basic value. Next, in step S126, the integrated controller 20 is configured to set the target torque transfer capacity tTc2 of the second clutch 7 to the sum of the torque transfer capacity, which corresponds to the drive force tFo, and the abovementioned torque transfer capacity compensation amount ΔtTc2. Finally, in step S131, the integrated controller 20 is configured to set the target torque transfer capacity tTc1 of the first clutch 6 to 0.

The integrated controller 20 is configured to control the engagement of the clutches 6 and 7 so that the torque transfer capacities of the clutches 6 and 7 attain the target clutch torque transfer capacities tTc1 and tTc2 by issuing a command in step S9 of FIG. 5 to the first clutch 6 and the second clutch 7, as shown in FIG. 4, with the command values of the target torque transfer capacity tTc1 of the first clutch 6 and the target torque transfer capacity tTc2 of the second clutch 7, which were derived in step S19 of FIG. 6, as shown in the flowchart of FIG. 13.

Referring back to FIG. 5, in step S8, after the first and second clutch target clutch torque transfer capacities tTc1 and tTc2 have been determined as mentioned in step S7 of FIG. 5 (FIGS. 6 to 10), the integrated controller 20 is configured to calculate the target motor/generator torque tTm by executing the subroutines shown in the flowcharts of FIG. 14 through FIG. 17.

Figure 14:
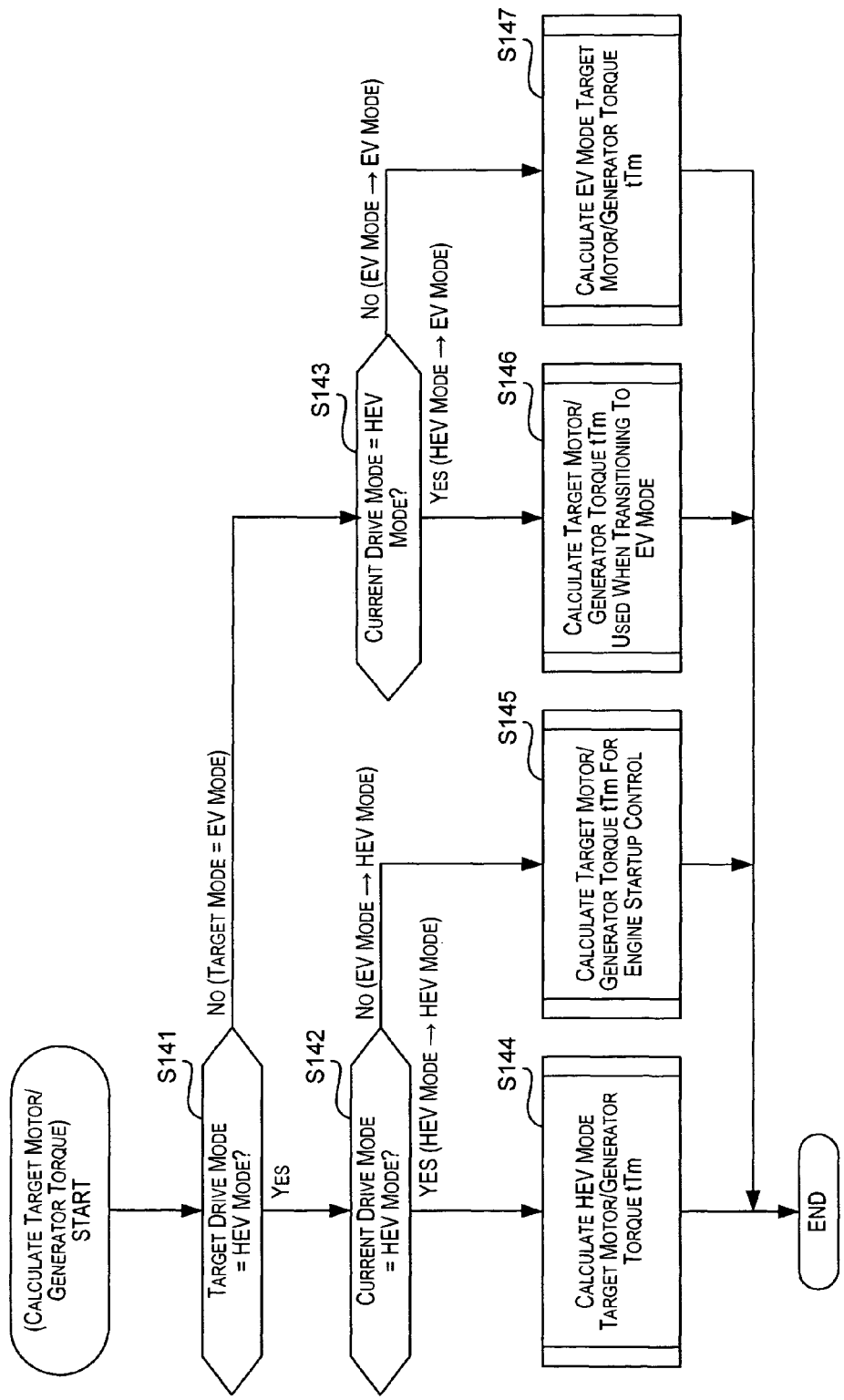
FIG. 14 is a flowchart showing a subroutine of the control process illustrated in FIG. 5 for calculating a target motor/generator torque in accordance with the illustrated embodiment of the present invention.

First, in step S141 of FIG. 14, the integrated controller 20 is configured to determine whether the target drive mode derived in step S3 of FIG. 5 is the HEV mode or not (EV mode). Subsequently, with either determination result in step S141, the integrated controller 20 is configured to determine in step S142 and step S143 whether the current drive mode is the HEV mode or not (EV mode).

If it is determined in step S141 that the target drive mode is the HEV mode (Yes in step S141), and in step S142 that the current drive mode is also the HEV mode (Yes in step S142), i.e., the HEV mode is to be maintained, then, in step S144, the integrated controller 20 is configured to set the target torque tTm of the motor/generator 5 to the target value for the HEV mode.

Figure 15:
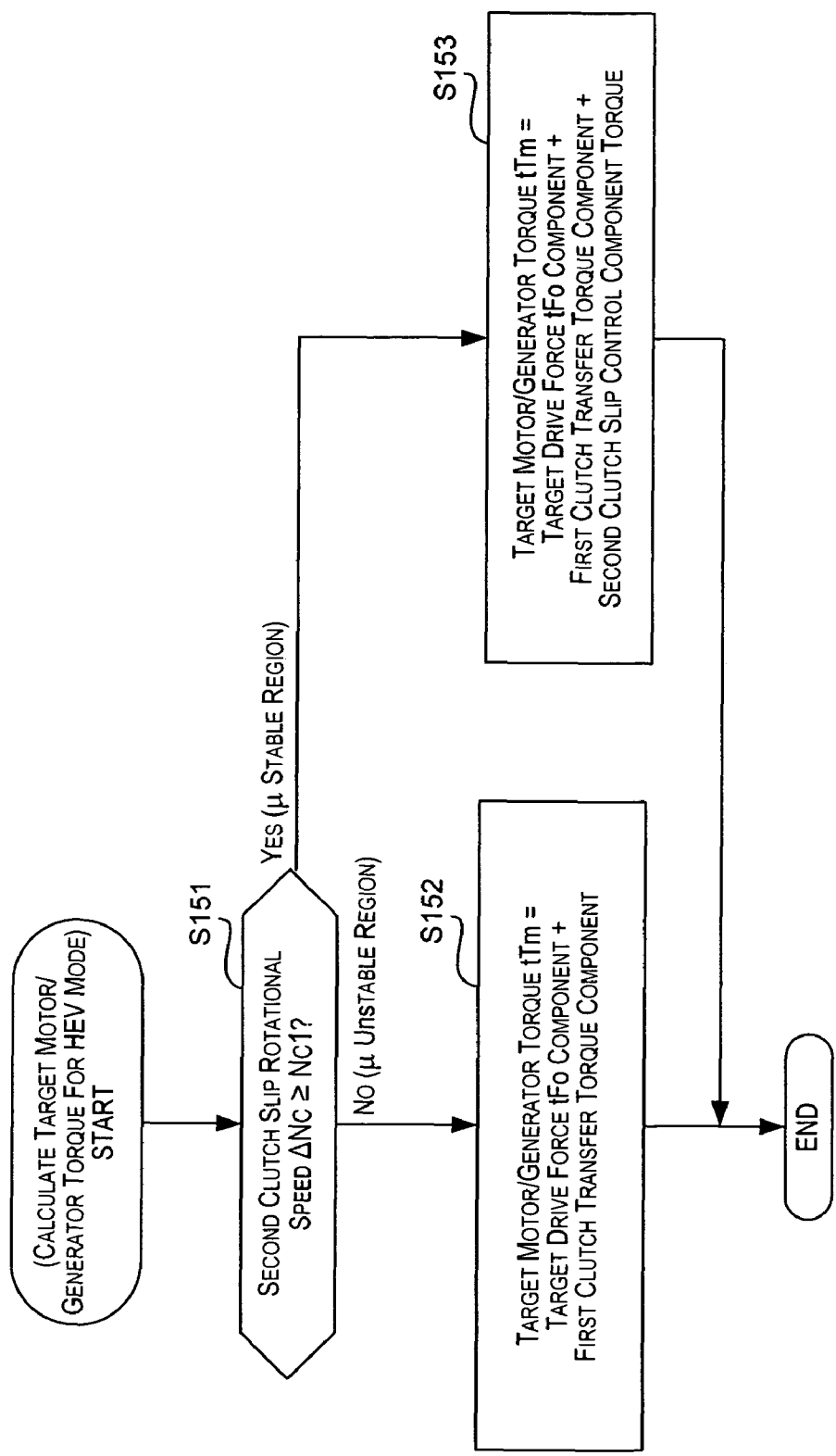
FIG. 15 is a flowchart showing a subroutine of the control process illustrated in FIG. 14 for calculating the target motor/generator torque for the HEV mode in accordance with the illustrated embodiment of the present invention.

The target motor/generator torque tTm for the HEV mode is determined as described in FIG. 15. In step S151 in FIG. 15, the integrated controller 20 is configured to determine whether a slip rotational speed differential ΔNc (=Nm−Ni) of the second clutch 7 is greater than or equal to a prescribed slip rotational speed differential ΔNc1.

Here, as mentioned above, the prescribed slip rotational speed differential ΔNc1 is used for determining whether the coefficient of friction μ is in the unstable coefficient of friction region, wherein the percentage change of the clutch coefficient of friction μ with respect to the slip rotational speed differential ΔNc of the second clutch 7 is relatively large and clutch judder tends to occur during clutch control (accordingly, feedforward control is preferable), or in the stable coefficient of friction region, wherein the percentage change of the clutch coefficient of friction μ with respect to the slip rotational speed differential ΔNc is relatively small and feedback control is possible. if the slip rotational speed ΔNc of the second clutch 7 is greater than or equal to the set rotational speed differential ΔNc1, then the coefficient of friction μ can be considered to be in the stable region. Further, if the condition ΔNc<ΔNc1 is satisfied, then it can be considered to be in the unstable region.

In the present embodiment, from this viewpoint, If it is determined in step S151 that the coefficient of friction μ is in the unstable region where ΔNc<ΔNc1 (No in step S151), then, in step S152, feedback control of the target motor/generator torque tTm is performed so that the target motor/generator torque tTm matches the sum of the drive force tFo component and the first clutch transfer torque component. If it is determined in step S151 that the coefficient of friction μ is in the stable region where ΔNc≧ΔNc1 (Yes in step S151), then, in step S153, feedback control of the target motor/generator torque tTm is performed so that the target motor/generator torque tTm matches the sum of the drive force tFo component, the first clutch transfer torque component and the second clutch slip control component of the torque. In this manner, the integrated controller 20 is configured to issue a command in step S9 of FIG. 5 to the motor/generator controller 22, as shown in FIG. 4, with a command value of the target motor/generator torque tTm, which was derived as described above with reference to FIG. 15.

Referring back to FIG. 14, if it is determined in step S141 that the target drive mode is the HEV mode (Yes in step S141), and in step S142 that the current drive mode is the EV mode (No in step S142), i.e., that the mode is to be switched from the EV mode to the HEV mode, then, in step S145, the integrated controller 20 is configured to set the target torque tTm of the motor/generator 5 to the required target value for starting up the engine when switching from the EV mode to the HEV mode.

Figure 16:
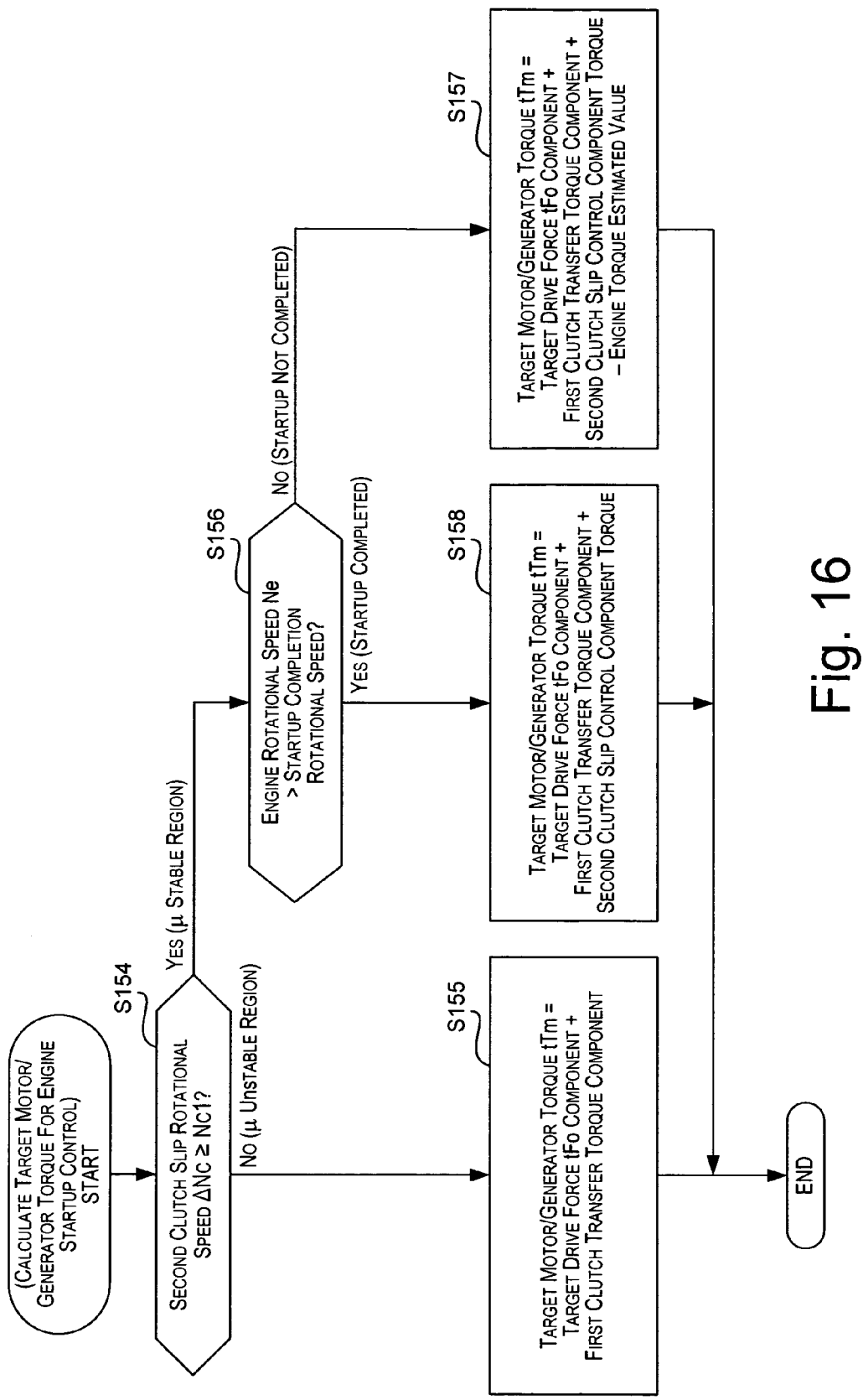
FIG. 16 is a flowchart showing a subroutine of the control process illustrated in FIG. 14 for calculating the target motor/generator torque for engine startup control in accordance with the illustrated embodiment of the present invention.

The target motor/generator torque tTm for engine startup control is determined as shown in the flowchart of FIG. 16. First, in step S154 of FIG. 16, the integrated controller 20 is configured to determine whether the coefficient of friction μ is in the stable region or the unstable region by determining whether the slip rotational speed differential ΔNc of the second clutch 7 is greater than or equal to the prescribed slip rotational speed differential ΔNc1.

If it is determined in step S154 that the coefficient of friction μ is in the unstable region where ΔNc<ΔNc1 (No in step S154), then, in step S155, the integrated controller 20 is configured to perform feedforward control of the target motor/generator torque tTm so that the target motor/generator torque tTm reaches the sum of the drive force tFo component and the first clutch transfer torque component.

The integrated controller 20 is configured to issue a command in step S9 of FIG. 5 to the motor/generator controller 22, as shown in FIG. 4, with a command value of the target motor/generator torque tTm, which was derived as described above with reference to FIG. 16.

If feedback control of the slip rotational speed of the second clutch 7 is performed by controlling the target motor/generator torque tTm in such an unstable coefficient of friction region, then the change in the clutch coefficient of friction (torque transfer capacity) is larger than the change in the slip rotational speed during feedback control, and there is a concern that the drive force will deviate from the target value tFo, or that a shock will be produced. However, in the present embodiment, these problems can be avoided by not performing feedback control of the slip rotation of the second clutch 7 by controlling the target motor/generator torque tTm in the unstable coefficient of friction region.

Furthermore, by setting the target motor/generator torque tTm to the sum of the drive force tFo component and the first clutch transfer torque component, it is possible to reliably attain the target drive force tFo, and to crank the engine 1 as prescribed by advancing the engagement of the first clutch 6.

If it is determined in step S154 in FIG. 16 that the coefficient of friction μ is in the stable region where ΔNc≧ΔNc1, then, in step S156, the integrated controller 20 is configured to determine whether the startup of the engine 1 has been completed or not by determining whether the engine rotational speed Ne is greater than or equal to the startup completion rotational speed.

If the startup of the engine 1 has not been completed (No in step S157), then, in step S157, the integrated controller 20 is configured to set the target motor/generator torque tTm to the sum of the drive force tFo component, the first clutch transfer torque component, and the second clutch slip control component of the torque, minus an engine torque estimated value. Then, the integrated controller 20 is configured to issue a command in step S9 of FIG. 5 to the motor/generator controller 22, as shown in FIG. 4, with a command value of this target motor/generator torque tTm.

Consequently, feedback control of the slip rotational speed of the second clutch 7 is performed so as to maintain the target value by controlling the target motor/generator torque tTm, and it is possible to prevent a scenario wherein an excessive engine torque component is transmitted to the drive wheels 2, making the drive force exceed the target drive force tFo.

In this embodiment of the present invention, the slip rotational speed target value of the second clutch 7 is set to a value greater than or equal to the prescribed value ΔNc1. However, it is possible to set a lower limit value needed to ensure that the fluctuations in the drive force to the drive wheels 2 falls within a permissible range, thereby mitigating, for example, torque fluctuations during engine startup, or the transmission of the first clutch 6 engagement shock to the wheels 2.

Furthermore, in FIG. 16, the slip rotational speed differential ΔNc of the second clutch 7 was maintained at the target value by controlling motor generator torque. However, it is apparent from the disclosure of the present invention that the target slip rotational speed can be maintained by controlling the torque transfer capacity of the second clutch 7 instead, as discussed earlier in FIG. 9 and FIG. 11, or by maintaining the slip rotational speed by cooperatively performing both motor generator torque control and second clutch torque transfer capacity control.

If it is determined in step S156 that engine startup has completed (Yes in step S156), then, in step S158, the integrated controller 20 is configured to set the target motor/generator torque tTm to the sum of the drive force tFo component, the first clutch transfer torque component, and the second clutch slip control component of the torque. Then, the integrated controller 20 is configured to issue a command in step S9 of FIG. 5 to the motor/generator controller 22, as shown in FIG. 4, with a command value of this target motor/generator torque tTm.

Referring back to FIG. 14, if it is determined in step S141 that the target drive mode is the EV mode (No in step S141), and in step S143 that the current drive mode is the HEV mode (Yes in step S143), i.e., that the drive mode is to be switched from the HEV mode to the EV mode, then, in step S146, the integrated controller 20 is configured to set the target torque tTm of the motor/generator 5 to the target value for use when transitioning to the EV mode. Then, the integrated controller 20 is configured to issue a command in step S9 of FIG. 5 to the motor/generator controller 22, as shown in FIG. 4, with a command value of this target motor/generator torque tTm.

If it is determined in step S141 that the target drive mode is the EV mode (No in step S141), and in step S143 that the current drive mode is the EV mode (No in step S143), i.e., that the EV mode is to be maintained, then, in step S147, the integrated controller 20 is configured to set the target motor/generator torque tTm to the target value for the EV mode.

Figure 17:
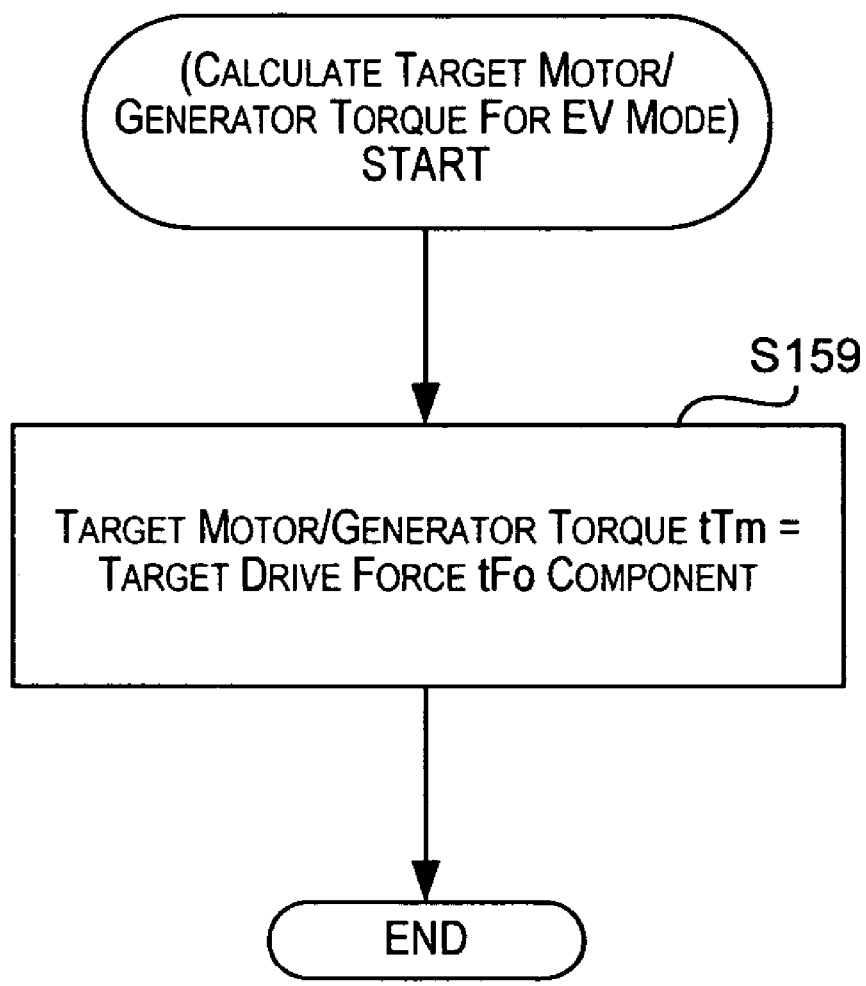
FIG. 17 is a flowchart showing a subroutine of the control process illustrated in FIG. 14 for calculating the target motor/generator torque for the EV mode.

Such a target motor/generator torque tTm for the EV mode is determined by executing the subroutine shown in the flowchart of FIG. 17.

More specifically, in step S159, the integrated controller 20 is configured to set the target motor/generator torque tTm to a value that corresponds to the drive force tFo. Then, the integrated controller 20 is configured to issue a command in step S9 of FIG. 5 to the motor/generator controller 22, as shown in FIG. 4, with a command value of this target motor/generator torque tTm.

Figure 18:
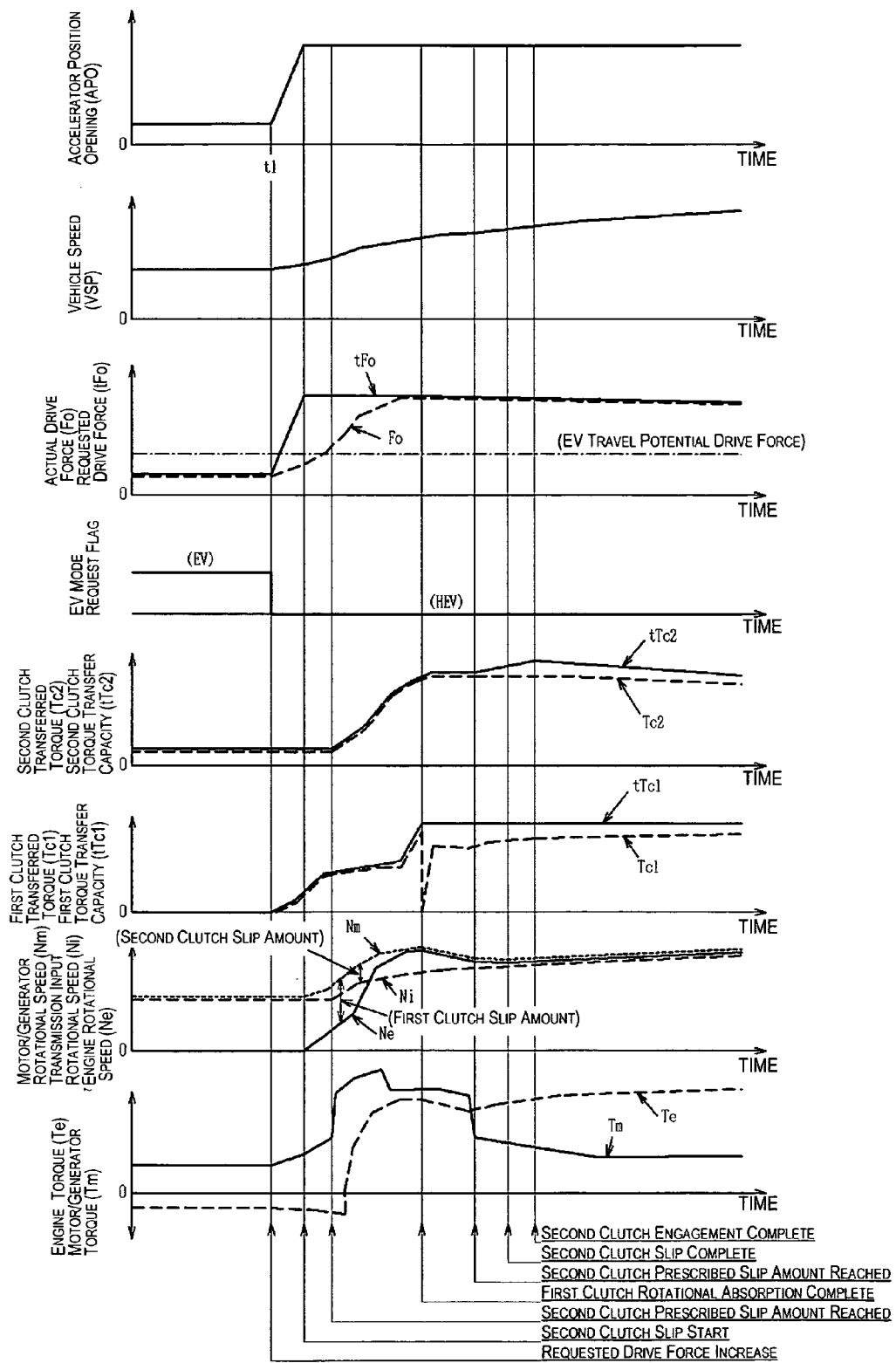
FIG. 18 is an operation time chart illustrating the operational effects of the control program shown in FIG. 5.

Referring now to an operation time chart shown in FIG. 18, the operational effect of controlling the engine startup according to the abovementioned embodiment is that the acceleration position opening APO during travel in the EV mode increases at an instant t1, as shown in FIG. 18. The following explains a case wherein the vehicle speed VSP changes attendant with changes in the requested drive force tFo (the actual drive force is indicated by Fo), and a request (engine startup request) is generated at instant t1 to switch from the EV mode to the HEV mode, referencing the time chart in FIG. 18.

At engine startup when switching to the HEV mode during travel in the EV mode, the second clutch torque transfer capacity tTc2 is set to a value that is more than zero and less than the engine startup motor/generator torque, as discussed earlier in FIG. 9 and FIG. 11. Consequently, even if torque fluctuations, including those caused by polarity inversion and engine torque overshoot at engine startup during the abovementioned mode switching, or torque fluctuations when engaging the first clutch are directed toward the drive wheels 2 via the second clutch 7, these torque fluctuations are absorbed by the slipping of the second clutch 7, and thereby do not transmit to the drive wheels 2, which prevents the shock attendant with these torque fluctuations.

On the other hand, because the second clutch 7 can maintain a torque transfer capacity that is less the engine startup motor/generator torque, and the corresponding torque can be continuously directed to the drive wheels 2, it is possible to avoid the problem caused by the conventional measure, wherein the second clutch is left in the disengaged state during engine startup, i.e., the problem that creates a sense of loss of drive force, and to thereby eliminate the attendant discomfort.

In addition, when setting the engine startup torque transfer capacity tTc2 of the second clutch 7 to a value that is more than zero and less than the engine startup motor/generator torque as mentioned above, instead of performing the method wherein the torque transfer capacity tTc2 of the second clutch 7 is controlled as discussed earlier with reference to FIG. 9 and FIG. 11, the objective can also be achieved by controlling the torque tTm of the motor generator 5 as discussed earlier in reference to FIG. 16, or, of course, by performing both methods in parallel.

If using the method wherein the torque transfer capacity tTc2 of the second clutch 7 is controlled as discussed earlier in reference to FIG. 9 and FIG. 11, then the second clutch 7 can rapidly transition to the slipping state and the abovementioned operational effect can therefore be achieved with good response. Furthermore, if using the method wherein the torque tTm of the motor generator 5 is controlled as discussed earlier in reference to FIG. 16, then the abovementioned operational effect can be attained by causing the second clutch 7 to transition to the slipping state while achieving the target drive force tFo.

Furthermore, when starting up the engine 1 in a state wherein the torque transfer capacity tTc2 of the second clutch 7 is set to a value that is more than zero and less than the engine startup motor/generator torque as mentioned above (the state wherein the second clutch 7 is caused to slip), the engagement of the first clutch 6 at engine startup is advanced regardless of the rotating state of the motor generator 5, as discussed earlier in reference to FIG. 8 and FIG. 9. Consequently, it is possible to reliably crank and start the engine 1 while achieving the abovementioned operational effect of preventing shock attendant with torque fluctuations caused by the slippage of the second clutch 7.

Furthermore, when switching from the EV mode to the HEV mode (engine startup), it is possible to determine whether to rapidly commence control of the advancing of the engagement of the first clutch 6, control of the torque transfer capacity of the second clutch 7, or to commence both simultaneously in accordance with the object of prioritization, i.e., shock reduction or improved engine startup response, based on the cause of, for example, a vehicle acceleration request, an operation state, or an electric travel mode to hybrid travel mode transition. Thereby, it is possible to achieve the abovementioned operational effects while the higher priority objective, i.e., shock reduction or improved engine startup response, is attained first. Specifically, when there is a request for high acceleration of the vehicle, control of the advancing of the engagement of the first clutch 6 is started first, and then the torque transfer capacity of the second clutch 7 is controlled. This is because engine startup responsiveness is prioritized when there is a request for rapid acceleration. Conversely, when there is a request for low acceleration of the vehicle, torque transfer capacity control of the second clutch 7 is started first, and then engagement advancing control of the first clutch 6 is performed. This is because there is margin in the engine startup time when the request is for low acceleration, and shock reduction is consequently prioritized. Thus, the integrated controller 20 is further configured to first start performing the engagement control of the first clutch 6, and then the torque transfer capacity control of the second torque transfer capacity of the second clutch 7, upon receiving a request for rapid acceleration in which a target acceleration rate is above a prescribed acceleration rate. The integrated controller 20 is further configured to first the torque transfer capacity control of the second torque transfer capacity of the second clutch 7, and then the engagement of control of the first clutch 6 upon receiving a request for low acceleration of the vehicle in which a target acceleration rate is below a prescribed acceleration rate.

The torque transfer capacity of the second clutch 7, or the torque of the motor generator 5, which are used to set the engine startup torque transfer capacity tTc2 of the second clutch 7 to a value that is more than zero and less than the engine startup motor/generator torque, is set, as discussed earlier in FIG. 9 and FIG. 11, or FIG. 16, to the sum of the target drive force equivalent component tFo and the first clutch torque transfer capacity tTc1 in the unstable region where the change in the coefficient of friction μ with respect to the slippage of the second clutch 7 is relatively rapid, and is set to the sum of the target equivalent component tFo, the first clutch torque transfer capacity tTc1, and the second clutch slip control component of the torque in the stable region where the change in the coefficient of friction μ with respect to the slippage of the second clutch 7 is relatively gradual. Consequently, in the unstable region, the torque transfer capacity of the second clutch 7 is determined by feedforward control without performing slip control (feedback control). Furthermore, in the stable region, the torque transfer capacity of the second clutch 7 is determined by feedback control, including slip control. Accordingly, in the unstable region, feedback control is performed and it is therefore possible to prevent clutch judder and control instability. In addition, in the stable region, the slippage of the second clutch 7 is set to the target value by feedback control, which makes it possible to more reliably achieve the abovementioned operational effect.

Furthermore, to achieve the second clutch slip control component of the torque in the stable region, it is possible to determine whether to use control of the torque transfer capacity of the second clutch 7, control of the torque of the motor generator 5, or both, in accordance with the object of prioritization, i.e., shock reduction or improved engine startup response, based on the cause of, for example, a vehicle acceleration request, an operation state, or an electric travel mode to hybrid travel mode transition. Thereby, it is possible to achieve the abovementioned operational effect while the higher priority objective, i.e., shock reduction or improved engine startup response, is attained first. Specifically, when there is a request for high acceleration of the vehicle, it is better to control the torque transfer capacity of the second clutch 7 if increased accuracy of control of the drive force is desired. Conversely, when there is a request for low acceleration of the vehicle and it is desired to accurately control slippage in order to reduce shock, it is better to control the torque of the motor generator 5. In other words, the integrated controller 20 is further configured to use the torque transfer capacity control of the second clutch 7 to control the target second torque transfer capacity tTc2 of the second clutch 7, upon receiving a request for rapid acceleration above a prescribed acceleration rate, and to use the target motor/generator torque tTm control to control the target second torque transfer capacity tTc2 of the second clutch 7, upon receiving a request for low acceleration below a prescribed acceleration rate.

When completing the transition from the EV mode to the HEV mode after engine startup, the first clutch 6 is engaged prior to the engagement of the second clutch 7, as discussed earlier in reference to FIG. 8 and FIG. 10.

In this case, when engaging the first clutch 6, the second clutch 7 is in a state wherein it is still possible for it to slip, and the engagement shock of the first clutch 6 can be absorbed and mitigated by the slipping of the second clutch 7.

Furthermore, when transitioning from the EV mode to the HEV mode, the determination of whether to first perform the engagement of the first clutch 6 or the startup of the engine 1, or whether to perform them both simultaneously is made in accordance with, for example, the slipping state of the second clutch 7, or the requested engine startup response. If the engagement of the first clutch 6 is to be performed prior to the startup of the engine 1, then it becomes possible to suppress rotational overshoot at engine startup; furthermore, if the startup of the engine 1 is performed prior to the engagement of the first clutch 6, then it becomes possible to accelerate engine startup response. Lastly, if the engagement of the first clutch 6 and the startup of the engine 1 are performed simultaneously, then it becomes possible to balance engine startup response with the effect of suppressing rotational overshoot at engine startup. Examples of the differentiated use mentioned above include the following. When the rotational speed of the clutch plate on the engine side of the first clutch 6 is low, e.g., when starting travel from a stopped state, the engine rotational increased component is small, and therefore it is better to first engage the first clutch 6, and then start the engine. Conversely, if the rotational speed of the clutch plate on the engine side of the first clutch 6 is high, e.g., when the traveling state transitions from the EV mode to the HEV mode, then the engine rotational increased component is large, and therefore, by first starting the engine 1 and then engaging the first clutch 6, it becomes possible to use the rotational increase of the engine itself in the event that the engine rotational speed increase does not suffice with just the engagement of the first clutch.

In the unstable region, where the change in the coefficient of friction $\mu$ with respect to the slippage of the second clutch 7 is relatively rapid, control in the hybrid travel mode is switched between the abovementioned torque control of the motor generator 5 and/or the abovementioned torque transfer capacity control of the second clutch 7, as discussed earlier in reference to FIG. 9 and FIG. 11. Consequently, feedback control does not continue in the $\mu$ unstable region, and it is therefore possible to prevent the occurrence of, for example, clutch judder or control instability.

001851 In addition, in the $\mu$ unstable region, if control is switched from the abovementioned second clutch torque transfer capacity control to hybrid travel mode control, then it is possible to transmit the torque generated by the engine 1 and the motor generator 5 in the $\mu$ unstable region as drive forces to the wheels 2, making it possible to improve motive power performance.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A hybrid vehicle drive control system comprising:
an engine;
a motor/generator;
a first clutch configured and arranged to change a first torque transfer capacity between the engine and the motor/generator;
a second clutch configured and arranged to change a second torque transfer capacity between the motor/generator and at least one drive wheel; and
a controller configured to selectively control the first and second clutches to switch between an electric drive mode in which the first clutch is released and the second clutch is engaged, and a hybrid drive mode in which both the first and second clutches are engaged,
the controller being further configured to set the second torque transfer capacity to a value that is more than zero and less than a target motor/generator torque of the motor/generator when starting the engine during a drive mode change from the electric drive mode to the hybrid drive mode,
the controller being further configured to generate slippage in the second clutch by setting the second torque transfer capacity of the second clutch to the value that is less than the target motor/generator torque for engine startup, and to engage the first clutch regardless of a rotational state of the motor/generator.

2. The hybrid vehicle drive control system as recited in claim 1, wherein
the controller is further configured to set the second torque transfer capacity of the second clutch by controlling the second torque transfer capacity of the second clutch when starting the engine.

3. The hybrid vehicle drive control system as recited in claim 2, wherein
the controller is further configured to set the second torque transfer capacity of the second clutch when starting the engine to a smaller value of a maximum drive force that can be generated by the motor/generator and a target vehicle drive force, and
the controller is further configured to reduce the second torque transfer capacity of the second clutch when starting the engine to generate a prescribed slippage in the second clutch.

4. The hybrid vehicle drive control system as recited in claim 3, wherein
the controller is further configured to control the prescribed slippage in the second clutch by performing feedback control of the second torque transfer capacity of the second clutch when the second clutch is determined to be operating in a coefficient of friction stable region in which the slippage of the second clutch is greater than or equal to a predetermined slippage value, and
the controller is further configured to control the prescribed slippage in the second clutch by performing feedforward control of the second torque transfer capacity of the second clutch when the second clutch is determined to be operating in a coefficient of friction unstable region in which the slippage of the second clutch is less than the predetermined slippage value.

5. The hybrid vehicle drive control system as recited in claim 1, wherein
the controller is further configured to set the second torque transfer capacity of the second clutch by controlling at least one of the second torque transfer capacity of the second clutch and the target motor/generator torque of the motor/generator when starting the engine.

6. The hybrid vehicle drive control system as recited in claim 1, wherein
the controller is further configured to set the second torque transfer capacity of the second clutch by controlling the target motor/generator torque of the motor/generator when starting the engine.

7. The hybrid vehicle drive control system as recited in claim 6, wherein
the controller is further configured to set the target motor/generator torque of the motor/generator to a sum of the target drive force, a first clutch transfer torque component, and the second clutch slip control component of the torque before starting the engine.

8. The hybrid vehicle drive control system as recited in claim 1, wherein
the controller is further configured to engage the first clutch after generating the slippage in the second clutch and prior to subsequent engagement of the second clutch when switching from the electric drive mode to the hybrid drive mode has been completed after the starting of the engine.

9. The hybrid vehicle drive control system as recited in claim 1, wherein
the controller is further configured to switch from a motor/generator torque control to a hybrid drive mode control when the second clutch is determined to be operating in a coefficient of friction unstable region in which the slippage of the second clutch is less than a predetermined slippage value.

10. The hybrid vehicle drive control system as recited in claim 1, wherein
the controller is further configured to selectively perform one of
first starting engagement control of the first clutch and then torque transfer capacity control of the second torque transfer capacity of the second clutch,
first starting the torque transfer capacity control of the second torque transfer capacity of the second clutch and then the engagement control of the first clutch, and
simultaneously starting the engagement control of the first clutch and the torque transfer capacity control of the second torque transfer capacity of the second clutch,
based on at least one of a vehicle acceleration request, an operation state, and a transition from the electric drive mode to the hybrid drive mode.

11. The hybrid vehicle drive control system as recited in claim 10, wherein
the controller is further configured to first start performing the engagement control of the first clutch, and then the torque transfer capacity control of the second torque transfer capacity of the second clutch, upon receiving a request for rapid acceleration above a prescribed acceleration rate, and the controller is further configured to first start performing the torque transfer capacity control of the second torque transfer capacity of the second clutch and then the engagement control of the first clutch upon receiving a request for low acceleration below a prescribed acceleration rate.

12. A hybrid vehicle drive control system comprising:
an engine;
a motor/generator;
a first clutch configured and arranged to change a first torque transfer capacity between the engine and the motor/generator;
a second clutch configured and arranged to change a second torque transfer capacity between the motor/generator and at least one drive wheel; and
a controller configured to selectively control the first and second clutches to switch between an electric drive mode in which the first clutch is released and the second clutch is engaged, and a hybrid drive mode in which both the first and second clutches are engaged,
the controller being further configured to set the second torque transfer capacity to a value that is more than zero and less than a target motor/generator torque of the motor/generator when starting the engine during a drive mode change from the electric drive mode to the hybrid drive mode,
the controller being further configured to set the second torque transfer capacity of the second clutch by controlling the second torque transfer capacity of the second clutch when starting the engine,
the controller being further configured to set the second torque transfer capacity of the second clutch when starting the engine to a smaller value of a maximum drive force that can be generated by the motor/generator and a target vehicle drive force,
the controller being further configured to reduced the second torque transfer capacity of the second clutch when starting the engine to generate a prescribed slippage in the second clutch,
the controller being further configured to control the prescribed slippage in the second clutch by performing feedback control of the second torque transfer capacity of the second clutch when the second clutch is determined to be operating in a coefficient of friction stable region in which the slippage of the second clutch is greater than or equal to a predetermined slippage value,
the controller being further configured to control the prescribed slippage in the second clutch by performing feedforward control of the second torque transfer capacity of the second clutch when the second clutch is determined to be operating in a coefficient of friction unstable region in which the slippage of the second clutch is less than the predetermined slippage value,
the controller being further configured to set the second torque transfer capacity of the second clutch to a sum of a target drive force equivalent component, the first torque transfer capacity of the first clutch, and a second clutch slip control component of the torque, when in the coefficient of friction stable region, and
the controller being further configured to set the second torque transfer capacity of the second clutch to a sum of the target drive force equivalent component and the first torque transfer capacity of the first clutch when in the coefficient of friction unstable region.

13. A hybrid vehicle drive control system comprising:
an engine;
a motor/generator;
a first clutch configured and arranged to change a first torque transfer capacity between the engine and the motor/generator;
a second clutch configured and arranged to change a second torque transfer capacity between the motor/generator and at least one drive wheel; and
a controller configured to selectively control the first and second clutches to switch between an electric drive mode in which the first clutch is released and the second clutch is engaged, and a hybrid drive mode in which both the first and second clutches are engaged,
the controller being further configured to set the second torque transfer capacity to a value that is more than zero and less than a target motor/generator torque of the motor/generator when starting the engine during a drive mode change from the electric drive mode to the hybrid drive mode,
the controller being further configured to set at least one of the second torque transfer capacity of the second clutch and the target motor/generator torque of the motor/generator, which are used in setting the second torque transfer capacity of the second clutch when starting the engine, to a sum of a target drive force equivalent component and a first torque transfer capacity of the first clutch when the second clutch is determined to be operating in a coefficient of friction unstable region in which the slippage of the second clutch is less than a predetermined slippage value, and
the controller being further configured to set at least one of the second torque transfer capacity of the second clutch and the target motor/generator torque of the motor/generator, which are used in setting the second torque transfer capacity of the second clutch when starting the engine, to a sum of the target equivalent component, the first torque transfer capacity of the first clutch, and a second clutch slip control component of the torque when the second clutch is determined to be operating in a coefficient of friction stable region in which the slippage of the second clutch is greater than or equal to the predetermined slippage value.

14. The hybrid vehicle drive control system as recited in claim 13, wherein
the controller is further configured to selectively use at least one of a torque transfer capacity control of the second clutch and a motor/generator torque control when in the coefficient of friction stable region to achieve the second clutch slip control component of the torque based on at least one of a vehicle acceleration request, an operation state, and a transition from the electric drive mode to the hybrid drive mode.

15. The hybrid vehicle drive control system as recited in claim 14, wherein
the controller is further configured to use the torque transfer capacity control of the second clutch, upon receiving a request for rapid acceleration above a prescribed acceleration rate, and
the controller is further configured to use the motor/generator torque control upon receiving a request for low acceleration below a prescribed acceleration rate.

16. A hybrid vehicle drive control system comprising:
an engine;
a motor/generator;

a first clutch configured and arranged to change a first torque transfer capacity between the engine and the motor/generator;

a second clutch configured and arranged to change a second torque transfer capacity between the motor/generator and at least one drive wheel; and a controller configured to selectively control the first and second clutches to switch between an electric drive mode in which the first clutch is released and the second clutch is engaged, and a hybrid drive mode in which both the first and second clutches are engaged, the controller being further configured to set the second torque transfer capacity to a value that is more than zero and less than a target motor/generator torque of the motor/generator when starting the engine during a drive mode change from the electric drive mode to the hybrid drive mode, the controller being further configured to set the second torque transfer capacity of the second clutch by controlling the target motor/generator torque of the motor/generator when starting the engine, and the controller being further configured to set the target motor/generator torque of the motor/generator to a sum of the target drive force, the first clutch transfer torque component, and the second clutch slip control component of the torque, minus an engine torque estimated value after starting the engine.

17. A hybrid vehicle drive control system comprising:
an engine;
a motor/generator;
a first clutch configured and arranged to change a first torque transfer capacity between the engine and the motor/generator;

a second clutch configured and arranged to change a second torque transfer capacity between the motor/generator and at least one drive wheel; and a controller configured to selectively control the first and second clutches to switch between an electric drive mode in which the first clutch is released and the second clutch is engaged, and a hybrid drive mode in which both the first and second clutches are engaged, the controller being further configured to set the second torque transfer capacity to a value that is more than zero and less than a target motor/generator torque of the motor/generator when starting the engine during a drive mode change from the electric drive mode to the hybrid drive mode, the controller being further configured to selectively perform one of
first starting engagement of the first clutch and then starting the engine,
first starting the engine and then starting the engagement of the first clutch, and
simultaneously starting the engagement of the first clutch and starting the engine,
depending on at least one of a slipping state of the second clutch and a requested engine response when starting the engine.

18. The hybrid vehicle drive control system as recited in claim 17, wherein
the controller is further configured to first start the engagement of the first clutch and then start the engine, upon determining that a vehicle is starting travel from a stopped state, and
the controller is further configured to first start the engine and then start the engagement of the first clutch upon determining that the vehicle is traveling.

19. A hybrid vehicle drive control system comprising:
an engine;
a motor/generator;
a first clutch configured and arranged to change a first torque transfer capacity between the engine and the motor/generator;

a second clutch configured and arranged to change a second torque transfer capacity between the motor/generator and at least one drive wheel; and a controller configured to selectively control the first and second clutches to switch between an electric drive mode in which the first clutch is released and the second clutch is engaged, and a hybrid drive mode in which both the first and second clutches are engaged, the controller being further configured to set the second torque transfer capacity to a value that is more than zero and less than a target motor/generator torque of the motor/generator when starting the engine during a drive mode change from the electric drive mode to the hybrid drive mode;

the controller being further configured to set the second torque transfer capacity of the second clutch to a sum of a target drive force equivalent component, the first torque transfer capacity of the first clutch, and a second clutch slip control component of the torque when in a coefficient of friction stable region in which slippage of the second clutch is greater than or equal to a predetermined slippage value, and the controller being further configured to set the second torque transfer capacity of the second clutch to a sum of the target drive force equivalent component and the first torque transfer capacity of the first clutch when in a coefficient of friction unstable region in which the slippage of the second clutch is less than the predetermined slippage value.

20. A hybrid vehicle drive control system comprising:
an engine;
a motor/generator;
a first clutch configured and arranged to change a first torque transfer capacity between the engine and the motor/generator;

a second clutch configured and arranged to change a second torque transfer capacity between the motor/generator and at least one drive wheel; and a controller configured to selectively control the first and second clutches to switch between an electric drive mode in which the first clutch is released and the second clutch is engaged, and a hybrid drive mode in which both the first and second clutches are engaged, the controller being further configured to set the second torque transfer capacity to a value that is more than zero and less than a target motor/generator torque of the motor/generator when starting the engine during a drive mode change from the electric drive mode to the hybrid drive mode, and the controller being further configured to switch from a second clutch torque transfer capacity control to a hybrid drive mode control when the second clutch is determined to be operating in a coefficient of friction unstable region in which the slippage of the second clutch is less than a predetermined slippage value.

21. A hybrid vehicle drive control system comprising:
first power supply means for supplying a first source of power;
second power supply means for supplying a second source of power;

first power transfer means for selectively changing a first torque transfer capacity between the first and second power supply means;

second power transfer means for selectively changing a second torque transfer capacity between the second power supply means and at least one drive wheel of a hybrid vehicle; and control means for selectively controlling the first and second power transfer means to switch between an electric drive mode by releasing the first power transfer means and engaging the second power transfer means, and a hybrid drive mode by engaging both the first and second power transfer means, the control means further including a function for setting the second torque transfer capacity to a value that is more than zero and less than a target torque of the second power supply means when starting the first power supply means during a drive mode change from the electric drive mode to the hybrid drive mode, and the controller means further including a function for generating slippage in the second power transfer means by setting the second torque transfer capacity of the second power transfer means to the value that is less than the target torque for engine startup, and a function for engaging the first power transfer means regardless of a rotational state of the second power supply means.

* * * * *